US006622365B2

(12) United States Patent
North et al.

(10) Patent No.: US 6,622,365 B2
(45) Date of Patent: *Sep. 23, 2003

(54) PINCH QUILL, APPARATUS, AND FILM WINDING METHOD

(75) Inventors: Stephen P. North, Rochester, NY (US); John M. Coval, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/994,296

(22) Filed: Nov. 26, 2001

(65) Prior Publication Data

US 2002/0050048 A1 May 2, 2002

Related U.S. Application Data

(62) Division of application No. 09/459,676, filed on Dec. 13, 1999, now abandoned.

(51) Int. Cl.[7] .................................................. B23P 11/00

(52) U.S. Cl. ................... 29/434; 242/532.5; 242/332.4; 242/586.5

(58) Field of Search ........................... 242/532.5, 532.6, 242/332.4, 586.5, 586; 396/6; 29/434, 806

(56) References Cited

U.S. PATENT DOCUMENTS

| | | | |
|---|---|---|---|
| 1,448,125 A | | 3/1923 | Kiracofe |
| 2,487,479 A | * | 11/1949 | Roehrl |
| 3,497,050 A | | 2/1970 | Landgraf |
| 3,982,709 A | | 9/1976 | Hertel |
| 4,131,352 A | | 12/1978 | Fauth et al. |

(List continued on next page.)

FOREIGN PATENT DOCUMENTS

| | | |
|---|---|---|
| EP | 0 494 680 A2 | 7/1992 |
| EP | 0 892 299 A2 | 7/1998 |
| JP | 63-271325 | 11/1988 |

OTHER PUBLICATIONS

U.S. patent application Ser. No. 09/459,676 filed Dec. 13, 1999, entitled Pinch Quill, Apparatus, and Film Winding Method, Stephen P. North and John M.Coval.
Office Communication for U.S. patent application Ser. No. 09/460,127 filed Dec. 13, 1999, entitled: Pinch Spools, One–Time Use Cameras, Apparatus, and Methods, Stephen P. North and John M. Coval, Confirmation No. 2054, Art. No. 3653, p. 4, first paragraph.
U.S. patent application Ser. No. 09/460,127* filed Dec. 13, 1999, entitled: Pinch Spools, One–Time Use Cameras, Apparatus, and Methods, Stephen P. North and John M. Coval.

*Primary Examiner*—David Vincent
*Assistant Examiner*—Steven A Blount
(74) *Attorney, Agent, or Firm*—Robert Luke Walker

(57) ABSTRACT

A pinch quill has a shank and a core and sheath apparatus. The core is rotatable about a longitudinal axis. The core has a recess sector and an adjoining recess sector. The chock sector has a greater radial dimension than the recess sector. The sheath is mounted coaxially over the core. The sheath is rotatable with the core about the axis. The sheath has an outer face, an inner face, and a longitudinal slot extending between the faces. The slot narrows to a throat at the inner face. The inner face includes a grip surface spaced apart from the throat. The grip surface is longitudinally aligned with the sectors. The sheath is pivotable about the axis between first and second angular orientations relative to the core. The slot is radially aligned with the chock sector at the first angular orientation. The grip surface is radially aligned with the chock sector at an intermediate angular orientation relative to the core. The intermediate angular orientation is between the first and second angular orientations. The core and sheath grip a filmstrip or other media strip in a quill-strip unit and method. A winder includes the pinch quill and a drive.

20 Claims, 16 Drawing Sheets

U.S. PATENT DOCUMENTS

| | | |
|---|---|---|
| 4,378,913 A | 4/1983 | Fohl |
| 4,451,011 A | 5/1984 | Engelsmann et al. |
| 4,692,083 A | 9/1987 | LeRoux et al. |
| 4,955,555 A | 9/1990 | Pierson et al. |
| 4,972,649 A | 11/1990 | Mochida et al. |
| 5,379,965 A | 1/1995 | Isler et al. |
| 5,533,687 A | 7/1996 | Tice |
| 5,610,679 A | 3/1997 | Sugano et al. |
| 5,689,876 A | 11/1997 | Suzuki et al. |
| 5,745,797 A | 4/1998 | Watkins et al. |
| 5,758,198 A | 5/1998 | Watkins et al. |
| 5,868,340 A | 2/1999 | Araki et al. |
| 5,895,126 A | 4/1999 | Watkins et al. |
| 6,003,802 A | 12/1999 | Eaton et al. |

\* cited by examiner

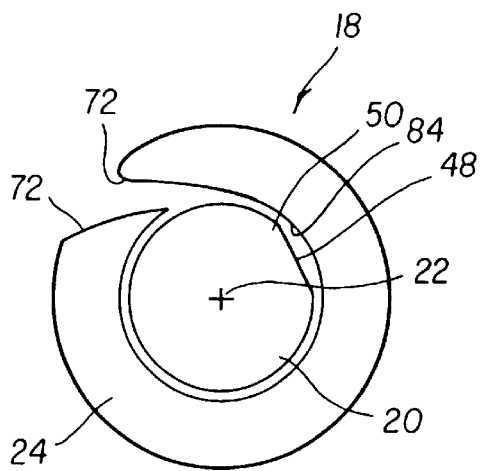
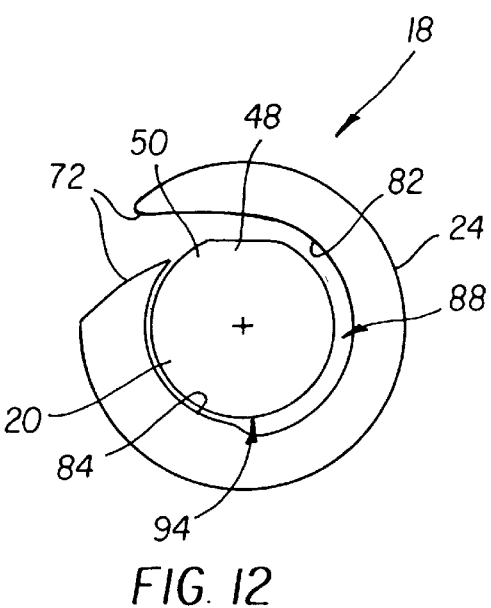
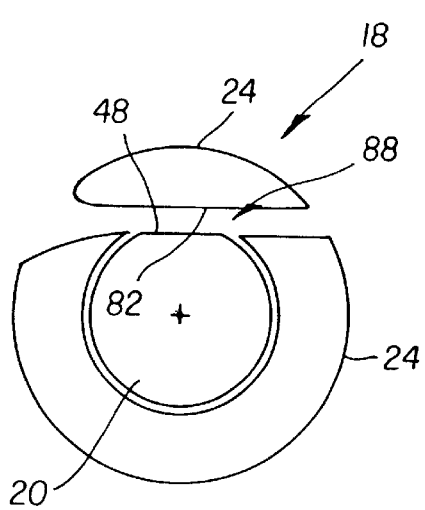
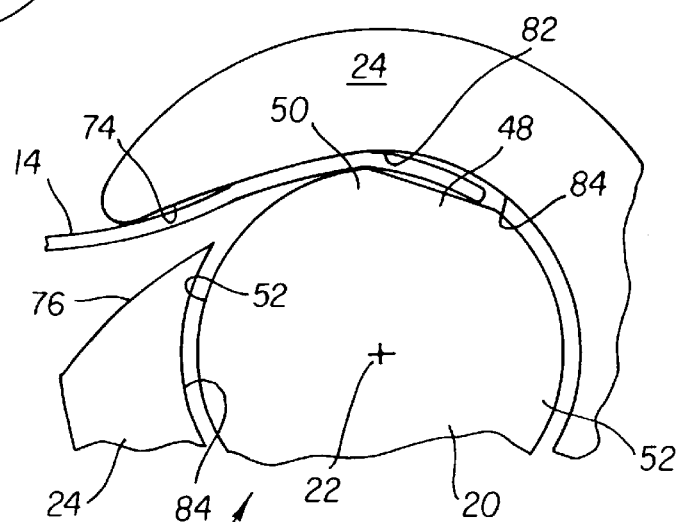
FIG. 11
FIG. 12
FIG. 13
FIG. 14

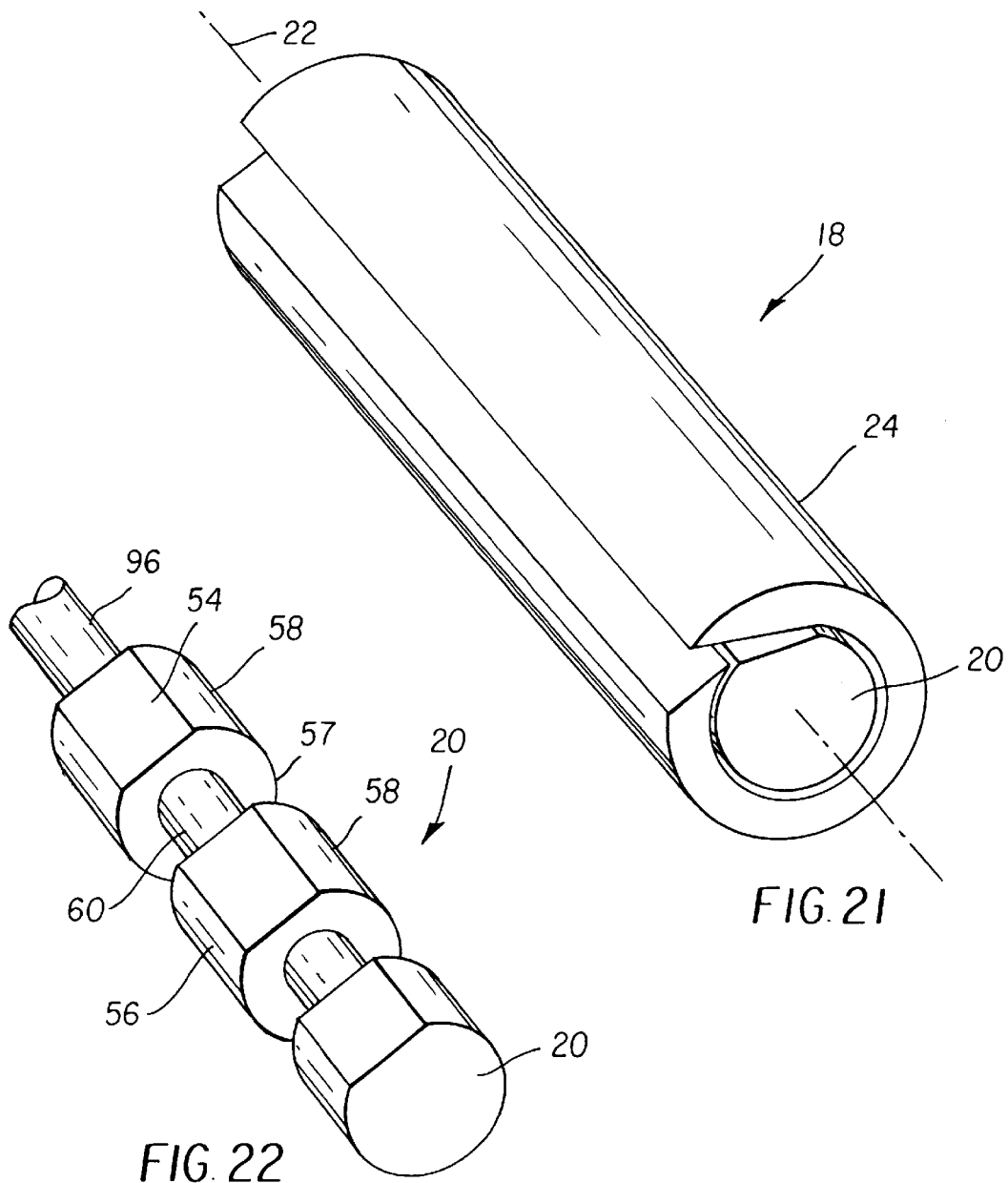
FIG. 21
FIG. 22
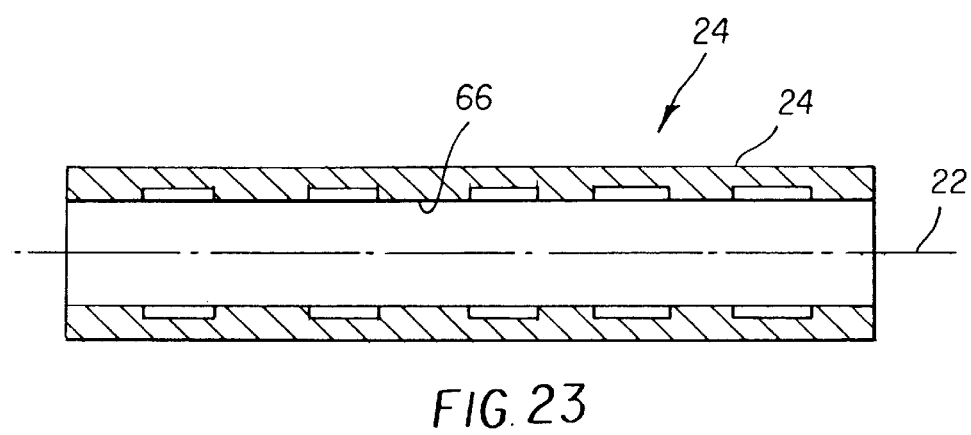
FIG. 23

PINCH QUILL, APPARATUS, AND FILM WINDING METHOD

CROSS REFERENCE TO RELATED APPLICATIONS

This is a divisional of application Ser. No. 09/459,676, filed Dec. 13, 1999 now ABN.

Reference is made to commonly assigned, co-pending U.S. patent application Ser. No. 09/460,127 filed Dec. 13, 1999 now U.S. Pat. No. 6,491,246, entitled: PINCH SPOOLS, ONE-TIME USE CAMERAS, APPARATUS, AND METHOD filed in the names of Stephen P. North and John M. Coval.

FIELD OF THE INVENTION

The invention relates to photographic film and film handling equipment and more particularly relates to clamping rollers, film winding apparatus, assemblies, and methods.

BACKGROUND OF THE INVENTION

A variety of spools and quills (here referred to collectively as "rollers") have been used to wind photographic filmstrips. A continuing problem has been attaching the filmstrip to the roller and later detaching the filmstrip. Tape has commonly been used to attach the filmstrip, but this adds additional steps and materials and presents a risk of contamination of processing materials by the adhesive unless the tape bearing segment of the film is segregated.

Another approach is to attach a narrowed end or leader attached to the filmstrip to the roller, by insertion in a slot or other structure and then winding. The filmstrip is held in place by frictional contact with the margins of the slot and other surfaces of the roller until a turn of the filmstrip overlaps. The increased friction tightens the filmstrip, cinching the filmstrip against the roller. Other approaches use an external guide in place of the slot to hold the filmstrip in place until cinching occurs. These procedures have the general shortcoming that cinching effectiveness decreases with increased winding speed. It is thus preferable, in these procedures, to always wind slowly or to cinch slowly and then increase winding speed after cinching is achieved. Winding speed can be increased by the use of structures on the roller that help grip the end of the filmstrip. U.S. Pat. No. 4,972,649 discloses a quill having a forked end and a spring positioned between the tines of the fork to help hold the end of the filmstrip.

Another approach similar to the above-described cinching procedures is to wedge the end of the filmstrip or leader into a narrow passage and then wind the filmstrip over the roller. This wedging procedure has the shortcoming that the better the filmstrip is wedged for initial film winding, the more difficult it is to remove the filmstrip later.

Another approach is to initially hold the filmstrip in place by pulling a vacuum through the roller. The vacuum can be released after one or more turns of filmstrip have been wound and the filmstrip is cinched. This approach requires that the filmstrip has good initial contact with the roller in order to establish the vacuum. U.S. Pat. No. 5,745,797 discloses a method and apparatus for winding film in the film roll chamber of a one-time use camera using a vacuum mandrel.

One-time use cameras are commonly sold preloaded with a cartridge of film. In order to reduce complexity and costs, a rewind mechanism is omitted from the camera. Instead, the film is prewound and during use is advanced back into the film canister. A number of approaches have been followed in loading and prewinding film cartridges for single use cameras. In some approaches, such as one taught in U.S. Pat. No. 4,972,649; film is prewound into a roll outside the camera body and then loaded. A shortcoming of these approaches is that the film roll must be handled after it is formed. This presents a risk of film damage and may add complexity to necessary equipment. In some other approaches, also taught in U.S. Pat. No. 4,972,649; the cartridge is loaded, the camera is light-tightly closed, and the film is then prewound using an exposed spool end. In still other approaches, such as taught by U.S. Pat. No. 5,311,231 and U.S. Pat. No. 5,745,797; the cartridge is loaded and then the rear opening of the camera body is closed and the film is prewound through a bottom opening, which is later sealed. In an approach taught by Japanese Kokai 6-295022, European Patent Application No. 0743546-A, and Japanese Kokai 8-171180, the film is wound onto a second spool, rather than being wound into a film roll. The back of the camera is not mandatory for guiding the film, since the second spool tends to restrain the film.

It would thus be desirable to provide improved quills, winders, apparatus, and methods in which film or other media is gripped easily for winding and released easily once coiled, but without requiring the use of a vacuum. It would also be desirable to provide for axial quill removal.

SUMMARY OF THE INVENTION

The invention is defined by the claims. The invention, in its broader aspects, provides a pinch quill that has a shank and a core and sheath apparatus. The core is rotatable about a longitudinal axis. The core has a recess sector and an adjoining recess sector. The chock sector has a greater radial dimension than the recess sector. The sheath is mounted coaxially over the core. The sheath is rotatable with the core about the axis. The sheath has an outer face, an inner face, and a longitudinal slot extending between the faces. The slot narrows to a throat at the inner face. The inner face includes a grip surface spaced apart from the throat. The grip surface is longitudinally aligned with the sectors. The sheath is pivotable about the axis between first and second angular orientations relative to the core. The slot is radially aligned with the chock sector at the first angular orientation. The grip surface is radially aligned with the chock sector at an intermediate angular orientation relative to the core. The intermediate angular orientation is between the first and second angular orientations. The core and sheath grip a filmstrip or other media strip in a quill-strip unit and method. A winder includes the pinch quill and a drive.

It is an advantageous effect of the invention that quills, winders, apparatus, and methods are provided in which film or other media is gripped easily for winding and released easily once coiled, without the use of a vacuum. It is also an advantageous effect that the quill can be removed axially.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

In FIG. 7, the core and sheath are in the first angular orientation. In FIGS. 8–10, the core and sheath are in an intermediate orientation.

FIG. 11 is the same view as FIG. 5, but the core and sheath are in the second angular orientation.

FIG. 12 is a radial cross-sectional view of another embodiment of the core and sheath apparatus.

FIG. 13 is a radial cross-sectional view of still another embodiment of the core and sheath apparatus.

FIG. 14 is a radial cross-sectional view of yet another embodiment of the core and sheath apparatus.

FIG. 21 is a perspective view of another embodiment of the core and sheath apparatus.

FIG. 22 is a perspective view of the core of the apparatus of FIG. 21.

FIG. 23 is a longitudinal cross-sectional view of the sheath of another embodiment of the core and sheath apparatus.

DETAILED DESCRIPTION OF THE INVENTION

Figure 1:
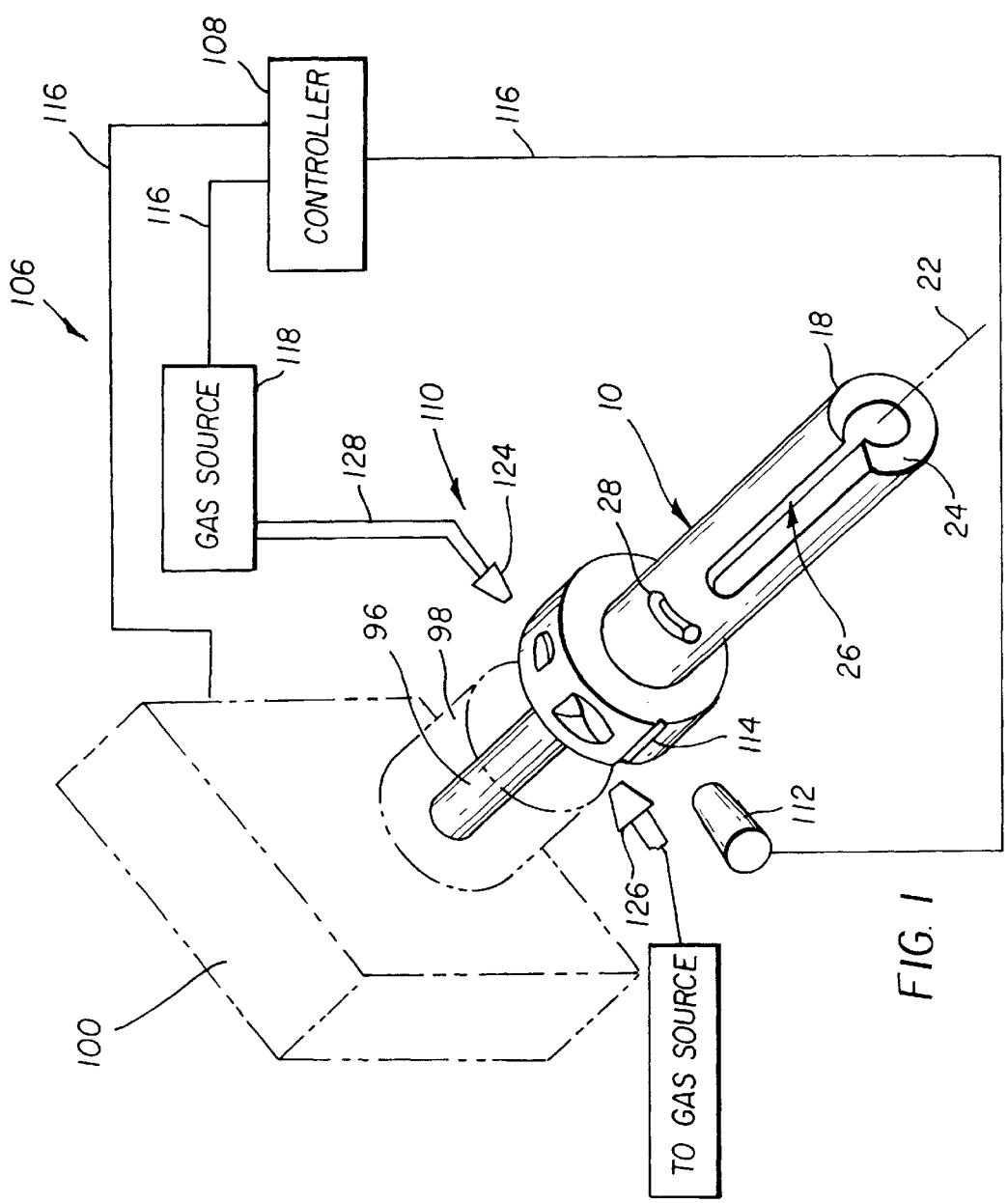
FIG. 1 is semi-diagrammatical perspective view of an embodiment of the media winder, which includes an embodiment of the pinch quill. The pinch quill includes an embodiment of the core and sheath apparatus. The housing support and film advance mechanism of the winder are not shown.

Referring initially to FIGS. 1–5 and 24–29, the pinch quill 10 and pinch spool 12 clamp the end of a media strip 14, such as a filmstrip 14a to hold the strip 14 during initial winding; and, if desired, to retain the end 16 of the strip 14 when the strip 14 is unwound. The inventions are particularly advantageous for filmstrips and are generally described and illustrated herein in relation to filmstrips.

The pinch quill 10 and pinch spool 12 each have a core and sheath apparatus 18. The core 20 of the apparatus 18 has a longitudinal axis 22. The sheath 24 is mounted coaxially over the core 20. The sheath 24 has a longitudinal slot 26. The sheath 24 is rotated with the core 20 when the core 20 is rotated about the longitudinal axis 22. The term "rotate" is used herein to refer to rotary movement about the axis 22 over a range that is greater than a pivoting movement described below. In preferred embodiments, "rotating" refers to a movement through 360 degrees or more.

The pinch quill 10 and pinch spool 12 each have a coupling 28 joined to the core and sheath apparatus 18. A coupling 28 has a first part 30 fixed to the sheath 24 and a second part 32 fixed to the core 20. The term "fixed", used herein, refers to a joining of two items that maintains the items in invariant spatial relation to each other and the like relationship of two portions of a single item, made as one piece. The "fixed" items or portions, if mobile during use, move as a single unit and may or may not be subject to bending or other geometric distortion during use. The "fixed" items or portions may or may not be subject to disassembly or other separation and may be joined together through an intermediate item. The core 20 and sheath 24 are preferably rigid structures that do not perceptibly bend during use.

The core 20 and sheath 24 are joined together by the coupling 28 and the nesting of the core 20 within the sheath 24. The coupling 28 allows the sheath 24 to pivot about the axis 22 relative to the core 20 over a fraction of a circle, through a sequence of different angular orientations of the core 20 to the sheath 24. In currently preferred embodiments, the coupling 28 is longitudinally spaced from the slot 26. First and second parts 30,32 of the coupling 28 are engaged at first and second angular orientations and obstructed from pivoting further in first and anti-winding directions of rotation (indicated by arrows 34,36), respectively.

In the pinch quill 10 shown in FIGS. 3–4 and 16–18, the first part 30 is an extension that is continuous with the sheath 24. The extension has a pair of opposed stops 40,42 separated by an arcuate path 44. The second part 32 is a slider that is joined to and extends radially outward from the core 20. The slider 32 moves along the path 44 between the stops 42,44 as the sheath 24 pivots relative to the core 20. At the first and second angular orientations, the stops 40,42, respectively, are engaged by the slider 32 and block further pivoting in the first and anti-winding directions 34,36 respectively. The slider 32 is disengaged from the stops 40,42 at an intermediate angular orientation (shown in FIG. 4) between the first and second angular orientations. There are a plurality of intermediate angular orientations between the first and second angular orientations. In the following, the core and sheath are discussed only in terms of a single intermediate angular orientation. This is for convenience and reflects the fact that, for any particular media strip, there is a single intermediate angular orientation of the core and sheath at which the strip will be gripped.

Figure 24:
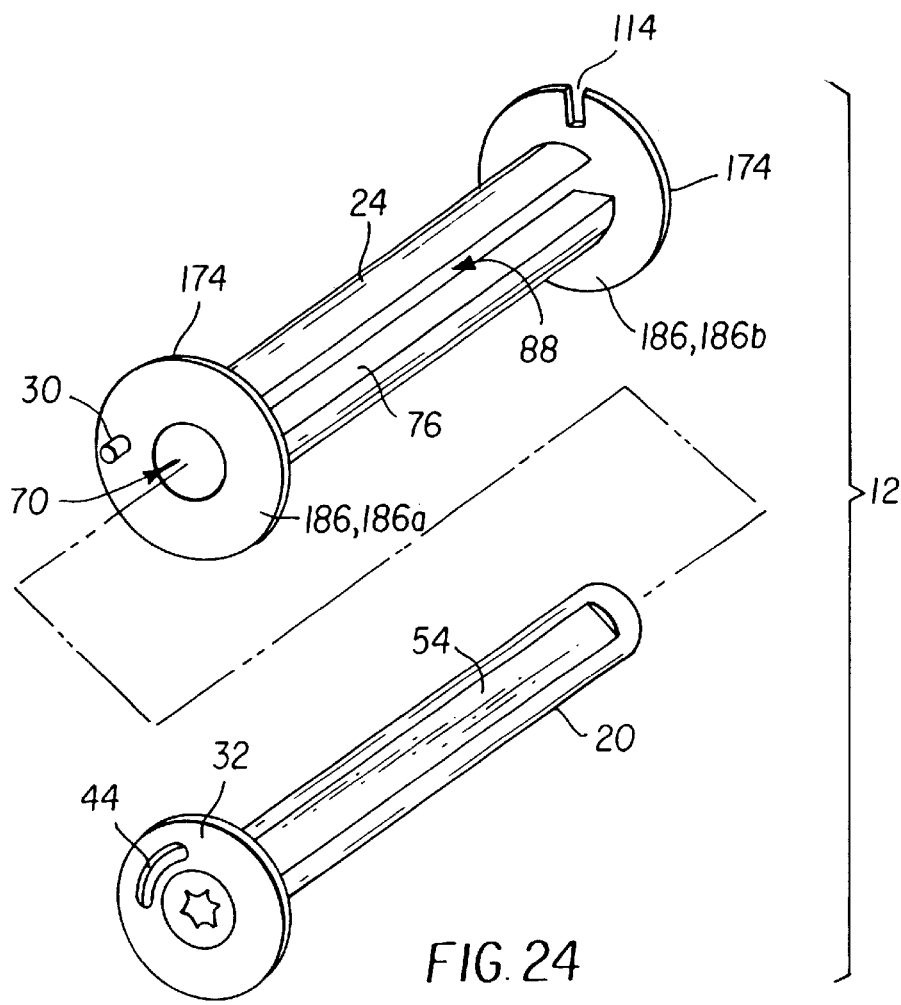
FIG. 24 is an exploded perspective view of an embodiment of the pinch spool, which includes the core and sheath apparatus of FIG. 5.
Figure 25:
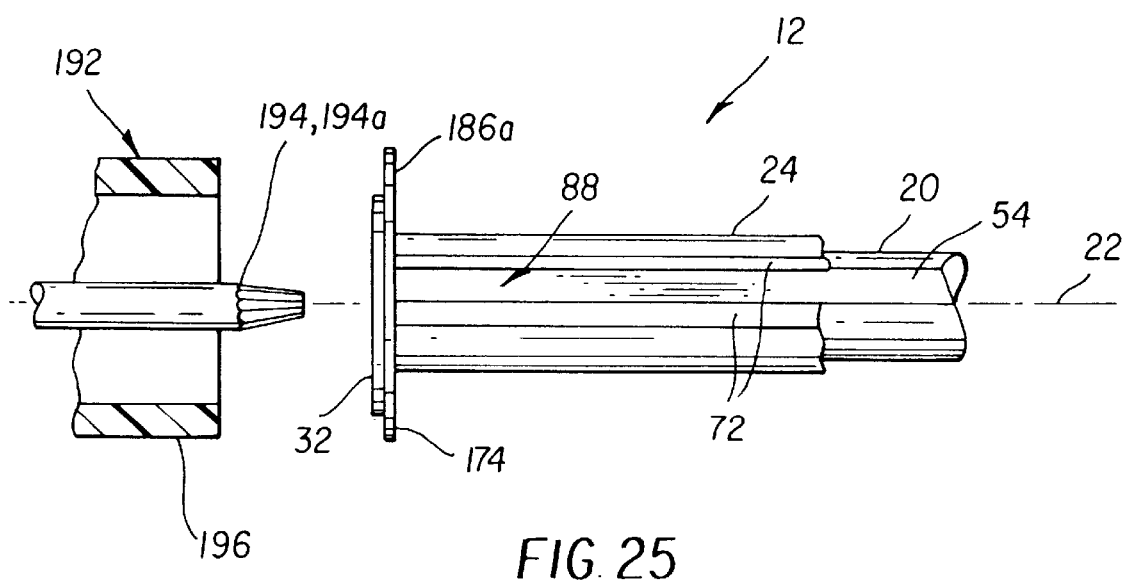
FIG. 25 is a partially cut-away side view of the pinch spool of FIG. 24 and the spindle and pivot tool of a spool winder.

In the pinch spool 12 shown in FIGS. 24–25, is like the coupling 28 just discussed, but the first part 30 is a slider 32 that extends axially outward relative to the sheath and the second part 32 is an extension that has opposed stops 40,42. In the pinch spool 12 of FIGS. 26–27, the first part 30 is an extension and the second part 32 is a slider that extends radially outward.

For simplicity, it is currently preferred that the sheath 24 is freely pivotable between the first and second angular orientations; however, detents or releasable catches (not shown) can be provided at one or more of the angular orientations, such as a particular intermediate orientation. The coupling 28 is described herein in terms of interacting rigid parts 30,32. A flexible connection (not illustrated) could also be used.

Figure 5:
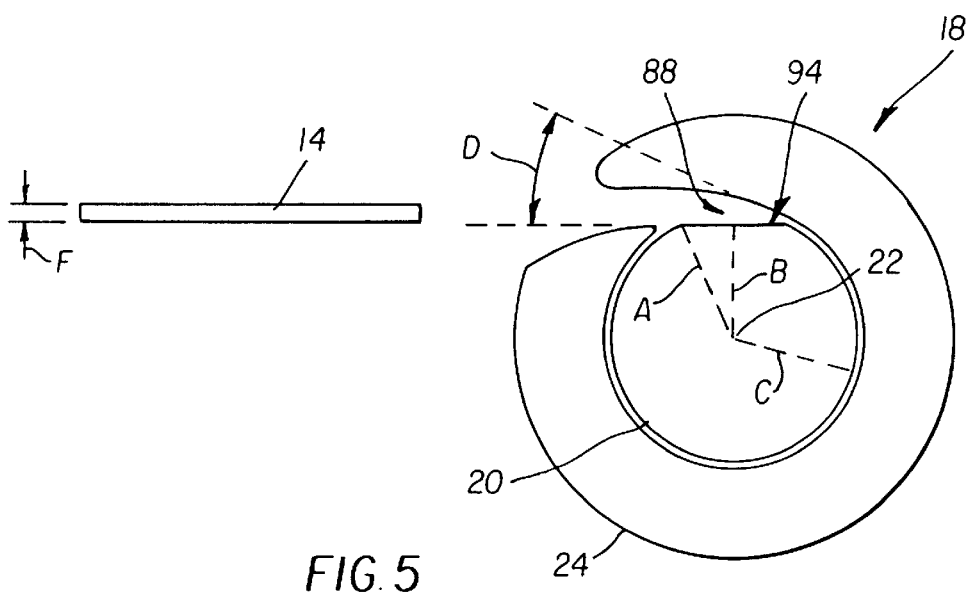
FIG. 5 is a radial cross-sectional view of the core and sheath apparatus of FIG. 1. The cross-section is parallel to a radius from the longitudinal axis and is, thus, perpendicular to the longitudinal axis. A section of filmstrip cross-sectioned in the same direction is also shown.
Figure 6:
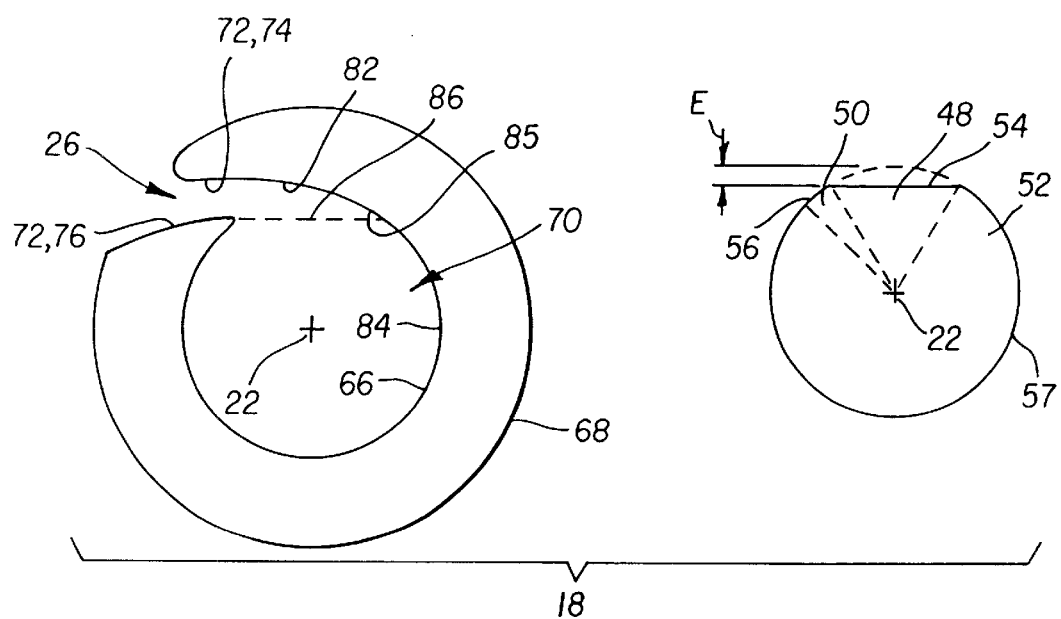
FIG. 6 is an exploded radial cross-sectional view of the core and sheath apparatus of FIG. 5.

Referring now particularly to FIGS. 5–6, the core 20 has a recess sector 48 and a chock sector 50 adjoining one side of the recess sector 48. Between the recess sector 48 and the chock sector 50 is a support sector 52. Each sector 48, 50, 52 is a three-dimensional portion of the core 20 and has a maximum cross-section in a plane perpendicular to the longitudinal axis 22 that is roughly the shape of a geometric sector. The chock sector 50 has a greater radial dimension (dashed line "A" in FIG. 5), relative to the longitudinal axis 22, than the radial dimension (dashed line "B") of the recess sector 48. The support sector 52, preferably, has a maximum radial dimension (dashed line "C") that is the same as the radial dimension "A" of the chock sector 50.

In the embodiment shown in FIG. 5, the core 20 has an invariant cross-section in the plane perpendicular to the longitudinal axis 22. The support sector 52 adjoins the recess sector 48 and extends around to and adjoins the chock sector 50. The recess sector 48, chock sector 50, and support sector 52 are each uniform in cross-section along said axis 22. The recess sector 48 has a flat face 54 and the chock sector 50 has an arcuate face 56. The support sector 52 has a face 57 that lies along a continuation of the same arc as the chock face 56. The sectors 48, 50, 52 can have other shapes, but that is not currently preferred.

Figure 19:
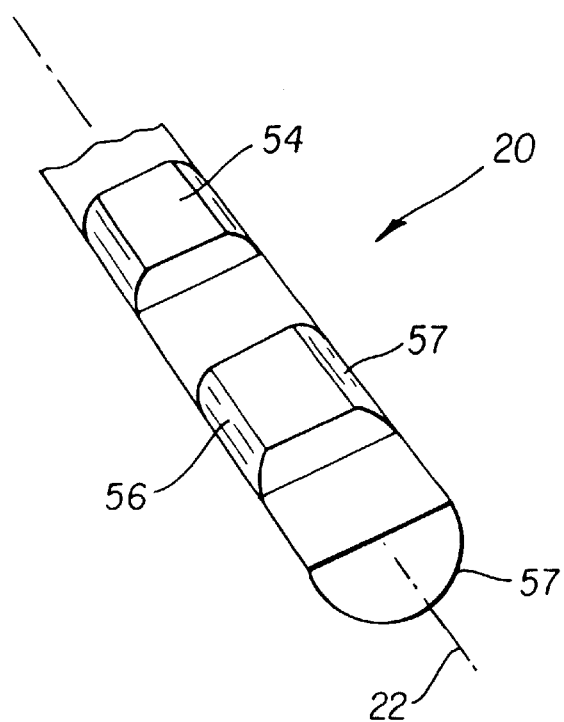
FIG. 19 is a partial perspective view of the core of another embodiment of the core and sheath apparatus.
Figure 20:
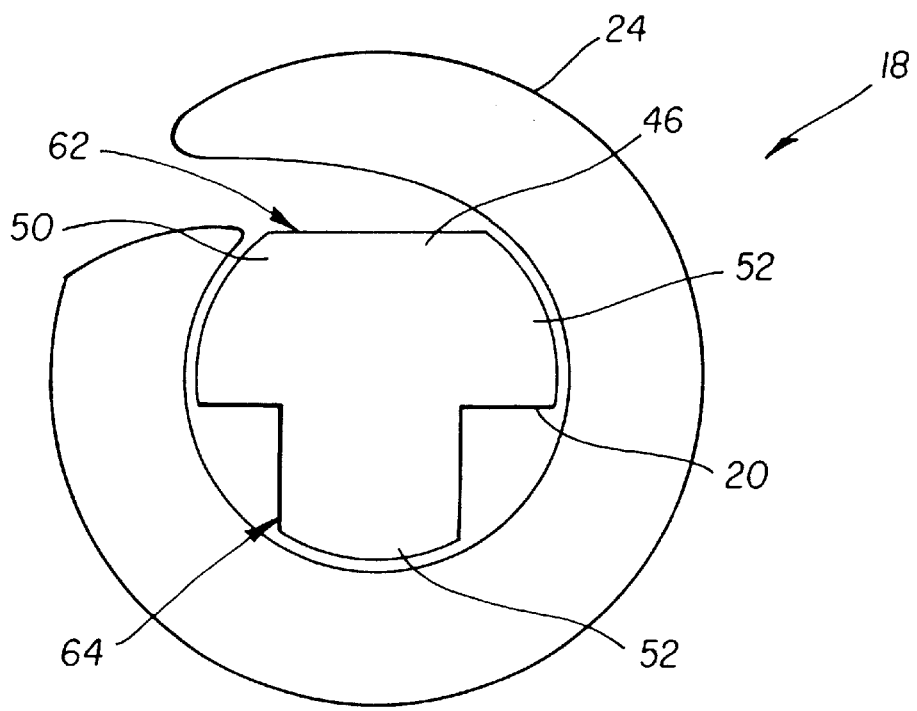
FIG. 20 is a radial cross-sectional view of another embodiment of the core and sheath apparatus.

The sectors 48, 50, 52 can be discontinuous both circumferentially and longitudinally. FIG. 22 shows an embodiment in which the core 20 overall is divided into contact segments 58 and inset spacer segments 60 along the longitudinal axis 22. In this embodiment, the contact segments 58 each include a section of each of the sectors 48, 50, 52 including the sections of the faces 54, 56, 57. In another embodiment shown in FIG. 19, the core is partially segmented, such that the faces 54,56 of the recess and chock sectors 48,50 are divided and a section of the support sector 57 is non-segmented. In another embodiment shown in FIG. 20, the core 20 is divided into longitudinal first and second contact segments 62,64. The chock and recess sectors 48,50 are limited to the first contact segment. The second contact segment 64 has part of the support sector 52.

Referring again primarily to FIGS. 5–6, the sheath 24 has opposed outer and inner faces 66,68. The inner face 68 defines a cylindrical core space 70 that is coaxial with the longitudinal axis 22 of the core 20. The core 20 fits within the core space 70. The longitudinal slot 26 extends between the outer and inner faces 66,68. A margin 72 bounds the slot 26. The margin 72 has opposed upper and lower portions 74,76 that extend longitudinally and parallel the axis 22. (The terms "upper" and "lower", and other directional terms used herein, refer to apparent directions in the drawings are otherwise arbitrary. The disclosed inventions can be used in any absolute orientation.)

Figure 15:
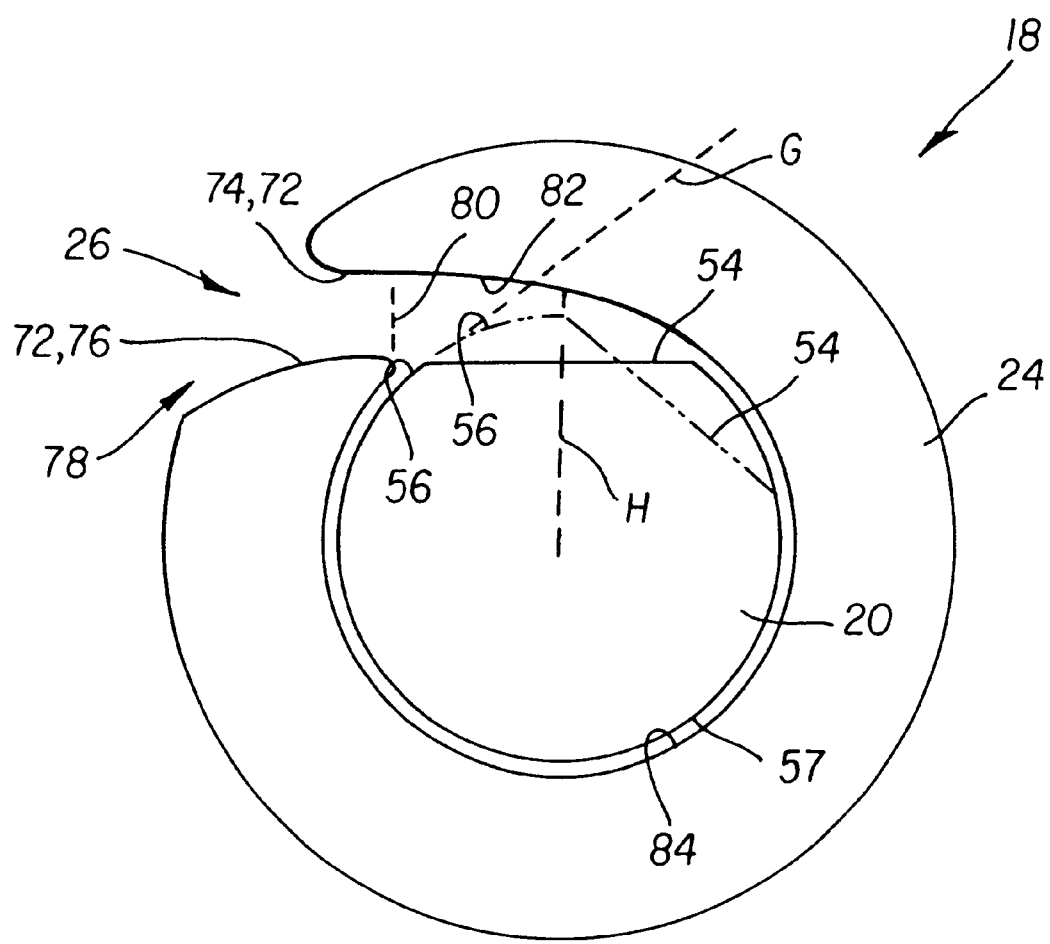
FIG. 15 is the same view as FIG. 5. The core and sheath are shown in the first angular orientation in solid lines and in an intermediate angular orientation in dashed lines. The throat and a tangent are also indicated by dashed lines.

The slot 26 has an outside opening 78 to the exterior environment. The upper and lower portions 74,76 of the margin 72 can be non-converging; but, for ease of media strip 14 admission, it is highly preferred that the upper and lower portions 74,76 of the margin 72 converge toward each other, such that the slot 26 narrows from the outside opening 78 to a throat 80. The throat 80, which is the narrowest portion of the slot 26, can immediately adjoin the interior of the sheath 24 or can be set back slightly from the interior due to rounding of edges or the like. The throat 80 is indicated in FIG. 15 by a dashed line.

The inner face 68 includes a grip surface 82, a support surface 84, and, in preferred embodiments, a transition 85. The sheath 24 is disposed over the core 20 such that the grip surface 82 is aligned longitudinally with the recess sector 48 and chock sector 50. The grip surface 82 adjoins and is interior to the upper portion 74 of the margin 72. The transition 85 is opposite the upper portion 74 at the inner end of the grip surface 82. The support surface 84 adjoins the transition 85. In the embodiment shown in FIG. 1, the support surface 84 continues from the transition 85, most of the way around the axis 22 to the lower portion 76 of the margin 72. The support surface 84 is in contact with the support sector 52 of the core 20.

Like the core 20, the sheath 24 can be segmented. The segmenting can be limited to the sheath 24 or both the core 20 and the sheath 24 can be segmented. In the latter case, segments of the core 20 and sheath 24 can overlap fully or partially, as desired. FIG. 23 illustrates a sheath 24 having a segmented grip surface 82 and support surface 84.

Referring now particularly to FIGS. 5–6, the grip surface 82 is disposed in spaced relation to the core space 70 and is at a greater radial separation from the longitudinal axis 22 than the support surface 84. (Radial and like terms used herein are relative to the longitudinal axis 22, unless specifically otherwise.) The transition 85 extends between the grip and support surfaces 82,84 and is, preferably, abruptly rounded off or squared off.

The core space 70 is cylindrical and the grip surface 82 is aligned with an imaginary chord 86 (shown in FIG. 6) of the core space 70. The grip surface 82 can be planar and roughly parallel to the chord 86 or slightly angled (angle "D" in FIG. 5) relative to the chord 86. The angle is preferably less than about 25 degrees and more preferably less than about 15 degrees. The grip surface 82 can also be gently curved, as shown in FIG. 5, within a space defined by flat surfaces at those angles. The upper and lower portions 74,76 of the margin 72 can be cut back to enlarge the opening 78.

Figure 7:
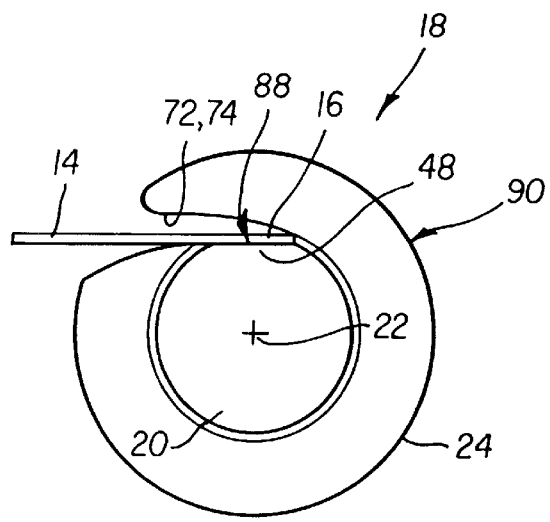
FIGS. 7–10 are the same view as FIG. 5, of the core and sheath and a section of filmstrip, at different stages during winding.

In the first angular orientation of the sheath 24 relative to the core 20, as shown in FIGS. 5, 7, and 15, the margin 72 is radially aligned with the chock sector 50; that is, a radius extending outward from the longitudinal axis 22 can intercept both the chock sector 50 and the margin 72. In the first angular orientation, the recess sector 48 is aligned with the chord of the core space 70 and faces toward and is separated from the grip surface 82 by a gap 88 that is roughly rectangular or wedge shaped. The term "gap" refers to an empty space defined by the sheath 24 and core 20 in some angular orientations of the sheath 24 and core 20. The gap 88 extends along the grip surface to the slot and has a minimum radial dimension that is no less than the thickness of a suitable media strip. The minimum radial dimension of the gap is also greater than the clearance between the support sector 52 and support surface 84. The gap 88 extends through a portion of the cylindrical core space 70. In the first angular orientation of the core 20 and sheath 24, the slot 26 and the gap 88 are aligned and a media strip 14 can be introduced into the gap 88 through the slot 26.

In the second angular orientation of the sheath 24 relative to the core 20, as shown in FIG. 11, the chock sector 50 is radially aligned with an inner part of the grip surface 82, or the transition, or preferably, with the support surface 84. In the second angular orientation, the gap is closed; that is, the empty space between the core 20 and sheath 24 has a pinch point, at which the radial separation is less than the thickness of a suitable media strip. This separation can be equal to the clearance between the support sector 52 and support surface 84, and is in the embodiment shown in FIG. 11.

Referring to FIGS. 8–10, and 15, in an intermediate angular orientation between the first and second angular orientations, the grip surface 82 is radially aligned with the chock sector 50. In the intermediate angular orientation, the gap 88 is narrower than in the first angular orientation at a pinch point adjoining the chock sector 50, but still extends through part of the core space 70. In the intermediate angular orientation, a radius through the chock sector does not intersect the throat. Referring to FIG. 15, in preferred embodiments, a radius through the chock sector 50 in the intermediate angular orientation intersects the grip surface 82 at the middle of the gap 88 between the throat 80 and the inner terminus 94 of the gap 88. This helps reduce any risk of slippage of the media strip 14. In these embodiments, a tangent ("G" in FIG. 15) can be drawn from the chock surface 50 in the first angular orientation. A radius ("H" in FIG. 15) drawn from the chock sector 50, in the intermediate angular orientation, intersects the grip surface 82 interior to the tangent "G".

In both the second and intermediate angular orientations, the lower portion 76 of the margin 72 is radially aligned with a portion of the support sector 52. The chock sector 50 is radially closer to the inner face 68 of the sheath 24 in the second angular orientation than in the intermediate orientation.

The media strip 14 is gripped by the core and sheath apparatus 18 in the manner shown in FIGS. 7–10. In FIG. 7, the sheath 24 and core 20 are disposed in the first angular orientation and a media strip 14 is introduced into the gap 88 through the slot 26.

Figure 8:
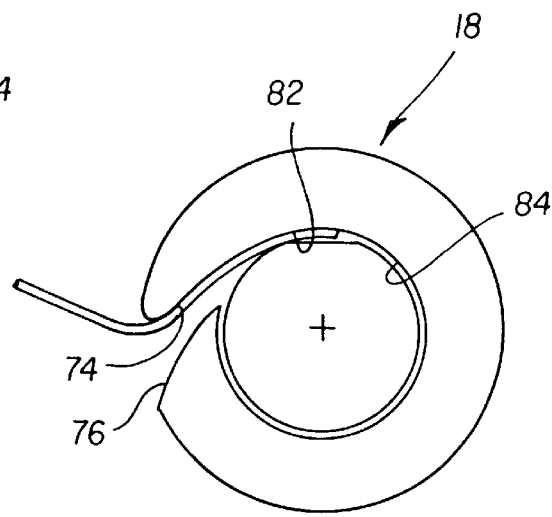

In FIG. 8, the sheath 24 is then pivoted relative to the core 20, in a counterclockwise direction for FIGS. 7–10, until the end 16 of the strip 14 is held between the chock sector 50 and the grip surface 82 and the sheath 24 assumes an intermediate angular orientation relative to the core 20. The strip 14 is held in place by contact with the grip surface 82 and chock sector 50. The extreme end or tip 87 of the strip 14 is not gripped. As shown in FIG. 6, the upper portion 74 of the margin 72 may frictionally contact the strip 14, depending upon the angle at which the strip 14 is delivered to the apparatus 18 and the tension in the strip 14. Frictional contact between the sheath 24 and core 20 also tends to hold the strip 14 in position within the gap 88.

Figure 9:
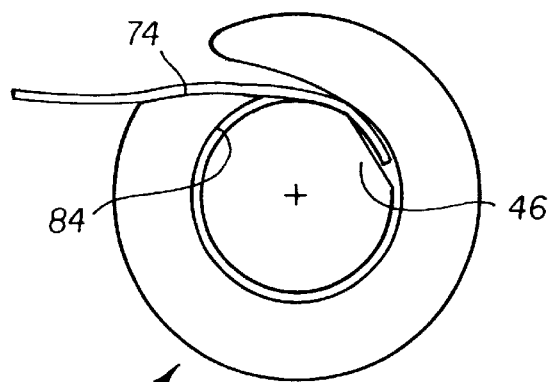
Figure 10:
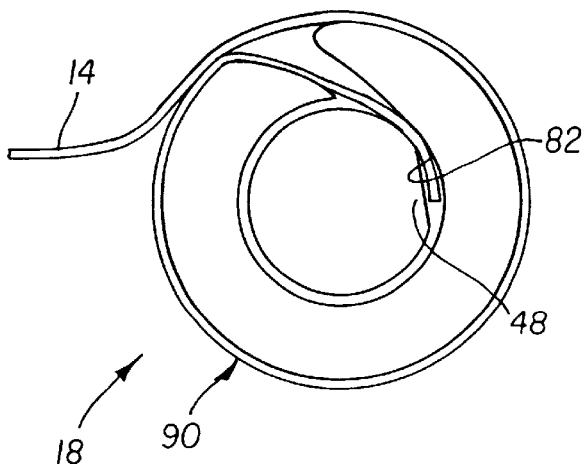

The core 20 is then rotated in a clockwise direction, as shown in FIG. 9. The chock sector 50 pushes the strip 14 against the grip surface 82 and, through the strip 14, causes the sheath 24 to rotate with the core 20 about the axis 22. The strip 14 comes into contact with the lower portion 76 of the margin 72 and then wraps over the outer face 66 of the sheath 24 as shown in FIG. 10. Additional turns (not shown) are wrapped over the initial turn.

Figure 16:
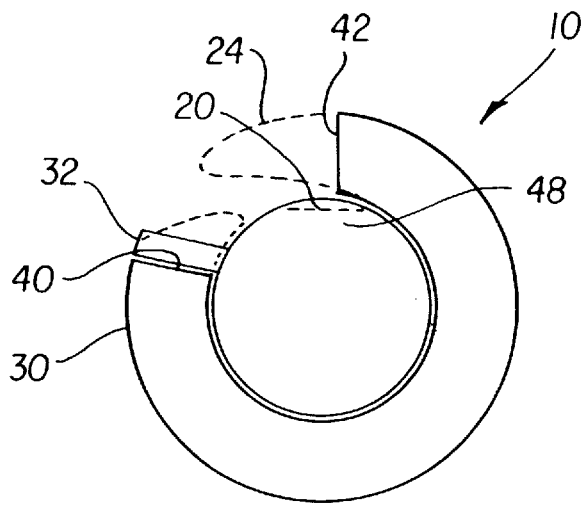
FIG. 16 is a radial cross-sectional view of the coupling of FIG. 1 when the core and sheath are in the first angular orientation. The relative positions of the core and sheath are indicated by dashed lines.
Figure 17:
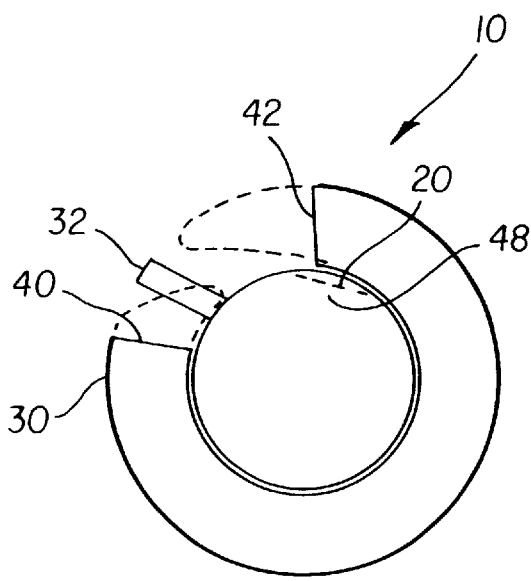
FIG. 17 is the same view as FIG. 16, but the core and sheath are in the intermediate angular orientation.
Figure 18:
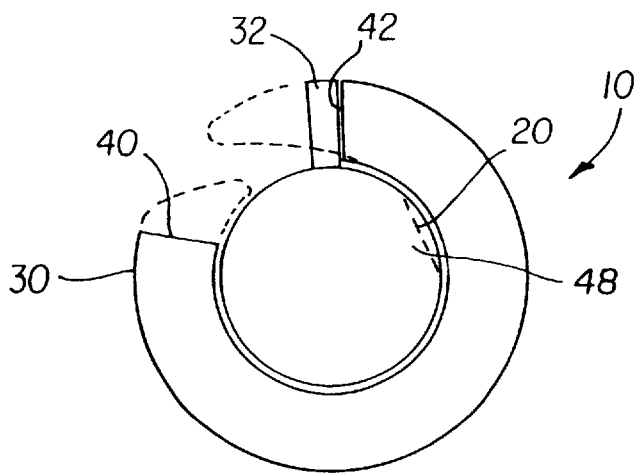
FIG. 18 is the same view as FIG. 16, but the core and sheath are in the second angular orientation.

When present, the strip 14 blocks relative movement of the sheath 24 and core 20 from the intermediate angular orientation to the second angular orientation. If a strip 14 is not present in the gap 88 when the sheath 24 is moved from the first angular orientation toward the second angular orientation, then the sheath 24 moves past the intermediate angular orientation and into the second angular orientation, as shown in FIG. 11. As shown in FIGS. 16–18, the extent of relative rotation of the sheath 24 and core 20 to attain the second angular orientation is determined by the relative positions of the stops 40,42 of the coupling 28.

The pinch quill 10 and pinch spool 12 can theoretically be used with any thickness of strip 14 that can be introduced into the gap 88. It is not particularly advantageous, however, to use the pinch quill 10 and pinch spool 12 to hold media 14 having a thickness of greater than two-thirds of a maximum gap thickness, that is, the maximum thickness of a strip 14 that can be introduced into the gap 88.

The quill-strip unit 90 and spool-media unit 92 of the invention, each include a media strip 14 gripped by a pinch quill 10 or a pinch spool 12, respectively. The media strip 14 has a thickness less than two-thirds of the maximum gap thickness. It is preferred that the strip units 90,92 include media 14 having a nominal thickness near the middle of the range of strip thicknesses capable of being gripped by the pinch quill 10 or pinch spool 12. This ensures that the strip 14 is held by the chock sector 50 and the grip surface 82, rather than by the chock sector 50 and the margin 72. This thickness also ensures that the strip 14 is easily removed from between the opposed grip surface 82 and chock sector 50 when the sheath 24 is in the first angular orientation and maximizes available tolerances for the thickness dimension of the strip 14 and the corresponding dimensions of the pinch quill 10.

In the embodiment shown in FIGS. 7–10, the transition 85 and the inner terminus 94 of the gap 88 is straight in from the slot 26. In an alternative embodiment, shown in FIG. 12, the gap 88 is recurvate. This is embodiment is not preferred, because the curved gap 88 adds friction and thus can make insertion and removal of the media strip 14 more difficult. In another embodiment, shown in FIG. 13, the gap 88 extends through the sheath 24 to the outside. This embodiment is not preferred, because the media strip 14 can extend outward through the gap 88, which presents a risk of crimping, or scuffing, or other damage.

Referring to FIGS. 7–10, it is preferred, to ensure easy removal of the media strip 14; that the gap 88, in the first angular orientation, is wider, at all points capable of receiving the filmstrip 14a, than the nominal thickness of the filmstrip 14a. The inner terminus of the gap 88 can be squared off or rounded to a greater dimension than the strip 14 nominal thickness such that the tip of the end of the strip 14 will not jam between the sheath 24 and core 20. In the embodiment shown in FIGS. 7–10, the recess face 54 is flat and has only sliding contact with the strip 14. The overlying transition 85 is rounded off and then extends downward to meet the recess face 54 at a roughly perpendicular angle. An alternative embodiment is shown in FIG. 14. In this embodiment, the inner face 68 of the sheath 24 and the recess sector 48 of the core 20 converge gradually. This allows the tip 87 of the end 16 of the media strip 14 to be wedged between the inner face 68 and the recess sector 48 and also allows the end 16 of the media strip 14 to be gripped between the chock sector 50 and the grip surface 82, in the intermediate angular orientation. This embodiment is not preferred. Removal and insertion of the media strip 14 is more difficult and the media 14 is not retained in place any better than in the other embodiments disclosed.

In a particular embodiment of the invention shown in FIGS. 5–6, the recess sector 48 lies along the chord 86 of the core space 70. The chord 86 is perpendicular to a radius and spaced in from the circumference by a dimension ("E" in FIG. 6) equal to twice the thickness ("F" in FIG. 5) of the media strip 14. The core 20 in this embodiment has a diameter that is six-tenths of the diameter of the sheath 24. The core 20 is spaced from the inner surface of the sheath 24 by a separation less than or equal to two-tenths of the thickness of the strip 14. The grip surface 82 extends outward at an angle of roughly 5 degrees to the chord 86. The lower portion 76 of the margin 72 is angled downward toward the outer face 66 at an angle of roughly twenty-five degrees from the chord 86.

The longitudinal dimension of the core 20 and sheath 24 is not critical in so far as film strips are concerned. The pinch quill 10 and pinch spool 12 can be readily sized for such current films as Type 135 film ("35 mm"), Advanced Photo System film, Type 120 film, and Type 220 film. The pinch quill 10 and pinch spool 12 are less advantageous for wide media, that is media for which the longitudinal dimension of the core 20 and sheath 24 would be so large that slippage and resulting telescoping would be likely to occur.

Referring now primarily to FIGS. 1–4, the pinch quill 10 has the core 20, sheath 24, and coupling 28 above-described and a shank 96 that is fixed to one end of the core 20 or the sheath 24. It is currently preferred that the shank 96 is attached to the core 20, since the core 20 is within the sheath 24. The shank 96 that is sized and shaped such that the shank 96 can be firmly gripped by a holder 98 (indicated in FIG. 1 by dashed lines) of a drive 100. For example, some convenient shapes are a uniform cross-section of circular, octagonal, or rectangular shape. The holder 98 is a chuck or collet or the like, which is rotated by the drive 100. The shank 96 is concentric with the core 20 and is held by the holder 98 such that the rotation of the holder 98 and core 20 is about the longitudinal axis 22.

Figure 3:
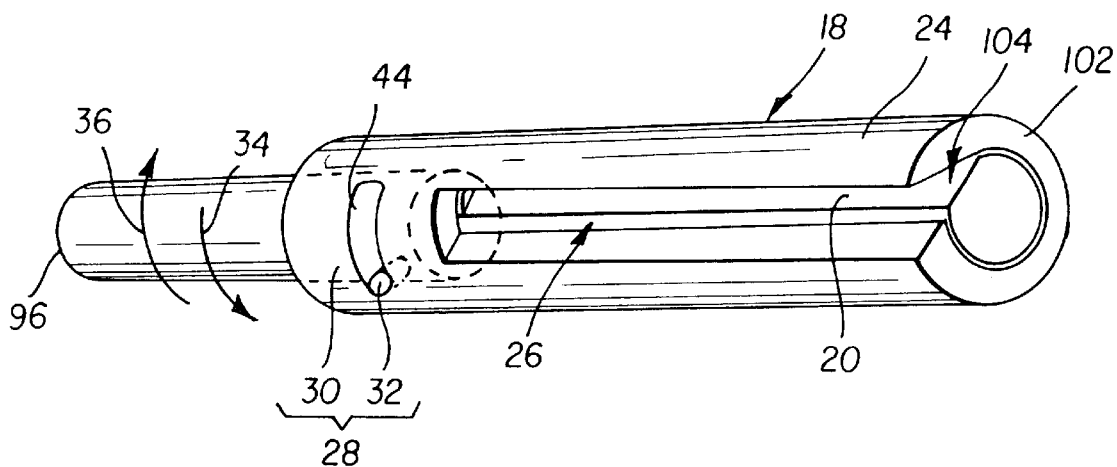
FIG. 3 is a perspective view of another embodiment of the pinch quill. The locations of internal parts of the coupling are indicated by dashed lines. The core and sheath are in the first angular orientation.
Figure 4:
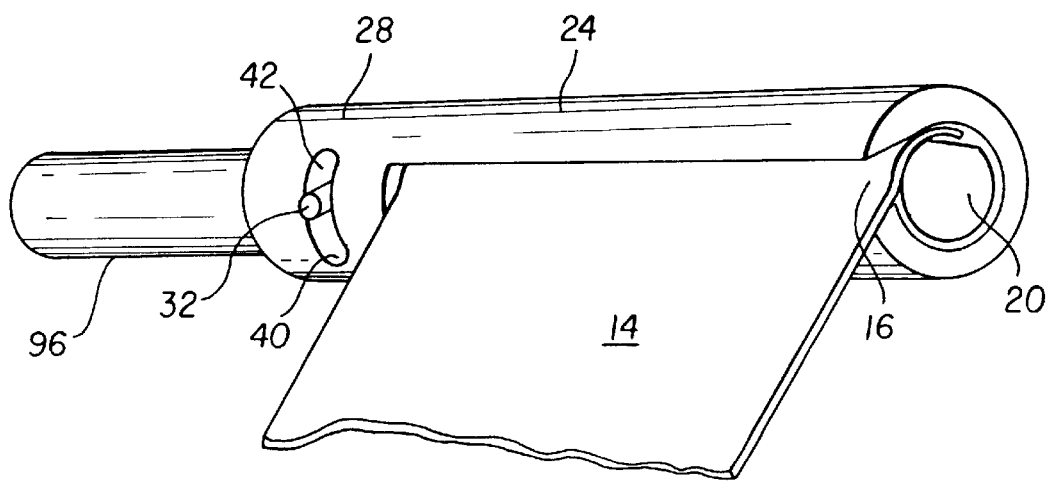
FIG. 4 is the same view as FIG. 3, except that the end of a filmstrip is gripped between the core and sheath, which are in an intermediate angular orientation.

Opposite the shank 96, the core 20 has an end face 102. It is preferred that the end face 102 is interrupted by an end-opening 104 of the slot 26, as shown in FIGS. 1, and 3–4. It is further preferred that the slot 26 has uniform dimensions in cross-section perpendicular to the axis 22, including at the end face 102 to reduce possible binding or misplacement of the media strip 14 during insertion and removal. The end opening 104 permits movement of the media strip 14 in and out of the gap 88, when the core and sheath are in the first angular orientation, in an axial direction, that is, a movement along the longitudinal axis 22.

The quill winder 106 has the pinch quill 10 mounted in a quill holder 98 of a drive 100. The holder 98 rotates the quill 10 to wind the media strip 14. The drive 100 has a motor (not shown) and can be a servomotor or the like. The quill winder 106 can be controller manually or can have a controller 108 using a microprocessor or the like or can be controlled by other automatic means. The sheath 24 can be pivoted relative to the core 20 by hand, but it is preferred that the quill winder 106 include a pivoter 110 operatively connected to the sheath 24. The pivoter 110 can be a lever (not shown), operated by a servomotor or solenoid or the like (not shown), that pushes on the slider 32 or the sheath 24 to pivot the sheath 24 relative to the core 20. The sheath 24 can alternatively be held in place by a lever, or the like, while the core 20 is pivoted. In an automated process, the pivoting can be detected by a sensor 112 that reads a notch or other mark 114 that moves indicative of the pivoting. A signal of this condition can be sent along a communication path 116 to the controller 108, which can signal to stop a drive 100 and order other actions.

In a particular embodiment of the invention, the pivoter 110 includes a gas source 118 and first and second vanes 120,122 fixed to the sheath 24. The vanes 120,122 are disposed to impel the sheath 24 in opposed first and anti-winding directions of rotation 34,36 about the axis 22, respectively, in response to gas jets (not illustrated). Each jet is delivered by a nozzle 124,126 that opens toward a respective vane 120,122. The nozzles 124,126 are joined by gas tubes 128 to the gas source 118. Communications paths 116 connect the gas source 118, sensor 116, and drive 100 to the controller 108. Vanes 120,122 can have a variety of shapes, as is known to those of skill in the art.

Figure 2:
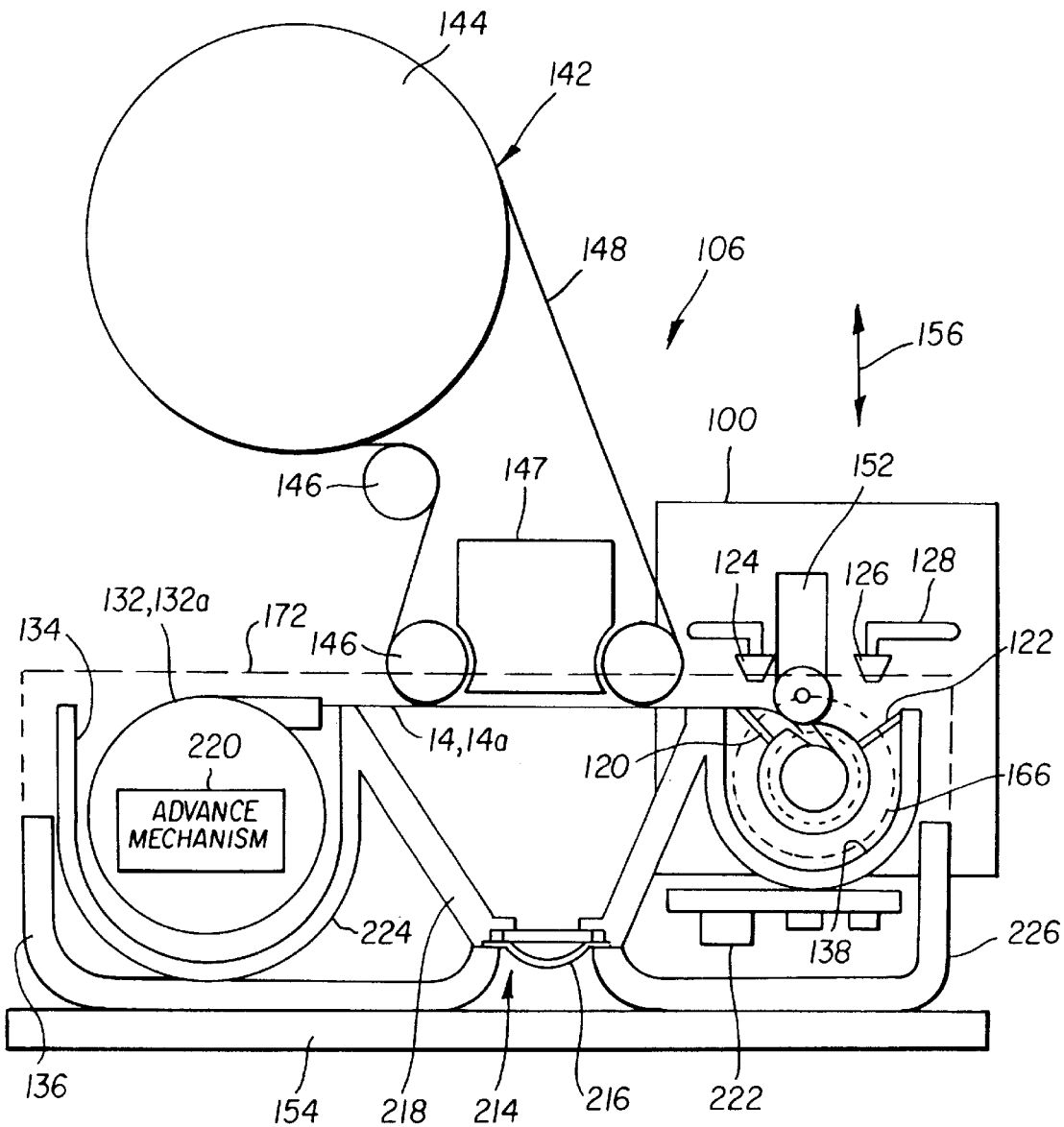
FIG. 2 is a semi-diagrammatical side view of the winder of FIG. 1 and a camera frame assembly. The controller and related components are not shown. The position of the filmstrip coil after winding is indicated by dashed lines. The position of light-tight back, after placement on the camera frame assembly, is indicated by dashed lines.

Referring now particularly to FIGS. 1–4 and 32, in the quill strip winding method, the pinch quill 10 is placed in an operative position relative to a media supply 132. The nature of the media supply 132 is not critical. The pinch quill 10 can wind a media strip 14 from roll or, a large or small spool. The spool can be unenclosed or covered by a housing. For convenience, the method is generally described, in the following, in terms of the embodiment shown in FIG. 2, but it will be understood that like considerations apply to other embodiments. In FIG. 2, the media supply 132 is a film cartridge 132a that is located in the film cartridge chamber 134 of a one-time use camera frame assembly 136. The pinch quill 10 is inserted (137) into an operative position within a film roll chamber 138 of the camera frame assembly 136. The camera frame assembly 136 has an open back and the film roll chamber 138 has an open end facing the drive 100. Thus, the movement of the pinch quill 10 into the film roll chamber 138 can be axial or perpendicular to the axis 22.

Within the film roll chamber 138, the pinch quill 10 is disposed (139) in the first angular orientation. The pinch quill 10 can be pivoted to this orientation before or after placement in the film roll chamber 138 and can be left in the first angular orientation by the preceding cycle. If pivoting is needed, an air jet is directed against the first vane 120, impelling the sheath 24 to rotate in a winding direction of rotation (indicated by arrow 34 in FIG. 3) until the slider 32 of the coupling 28 encounters the first stop 40.

The end of the filmstrip 14 is advanced (140) out of the cartridge 132a to the quill 10. This can be done by hand, but is preferably performed by automated equipment. For example, FIG. 2 illustrates a vacuum belt 142 that drives the filmstrip 14a to the film roll chamber 138. The vacuum belt 142 has a powered drive roller 144, a series of idler rollers 146, a vacuum source 147, and an endless belt 148. The vacuum source 147 lifts the filmstrip 14a, which is then advanced by the belt 148 to the opening of the film roll chamber 138. A wide variety of equipment for this purpose and for other aspects of camera assembly is well known to those of skill in the art.

The end of the filmstrip 14a is then directed (150) in the gap 88 between the core 20 and sheath 24. The directing can be manual, but is preferably automated by use of one or more guides 152 that urge the filmstrip into the gap 88. Suitable guides for this purpose are well known to those of skill in the art. Guide 152, shown in FIG. 2, and other components of the quill winder 106 are movable relative to the camera frame assembly and a support or transport system 154 in directions indicated by double-headed arrow 156, as needed.

An air jet is next directed against the second vane 122. The blowing of the air jet against the vane 122 impels the sheath 24 to pivot (158) in the anti-winding direction of rotation (indicated by arrow 36 in FIG. 3) toward the second angular orientation. If the strip end is present in the gap 88, then the sheath 24 closes against the strip 14 and the core and sheath assume the intermediate angular orientation. The end of the strip is clamped by the grip portion and the chock sector. If an error has occurred and the strip 14 is not present in the gap 88, then the sheath 24 continues to rotate until the slider 32 of the coupling 28 encounters the second stop 42. This rotation can be detected (160) by the sensor 112 to generate (162) an error signal to the controller which can initiate further action.

The sheath 24 is next rotated (164) with the core 20, in the winding direction of rotation, until the strip 14 forms a coil 166. When winding is finished, an air jet is directed against the first vane 120 impelling the sheath 24 to pivot (168), relative to the core 20, in the anti-winding direction of rotation until the pinch quill 10 releases from the strip 14. The filmstrip 14a is resilient and clock-springs radially outward to the limits of the film roll chamber 138 or other housing, when the pinch quill 10 releases from the strip 14. The filmstrip remains in a loose coil. The end of the filmstrip 14a may or may not remain in the gap 88 depending upon factors including the length and resilience of the film and the extent of clock-springing. The pinch quill 10 is then removed (170) from the coil 166 in an axial direction through the end-opening 104. The camera frame assembly 136 is then closed (173) light-tightly by placing a back 172 (indicated by dashed line in FIG. 2) over the chambers.

Referring now particularly to FIGS. 24–31, the pinch spool 12 has the core 20, sheath 24, and coupling 28 above-described and one or more support rims 174. The support rim or rims 174 are annular in shape. The pinch spool 12 forms a spool-media unit 92 with the media strip 14 gripped by the pinch spool 12. The spool-media unit 92 can also include a housing 178 that holds and supports the pinch spool 12 and media 14. The support rim or rims 174 bear against the housing 178 so as to permit rotation of the spool 12 relative to the housing 178. The housing 178 is preferably shaped so as to closely adjoin the support rim or rims 174 such that the support rim or rims 174 hold the spool 12 in position within the housing 178. In preferred embodiments, the media is film and the housing 178 is a body 178a of a one-time use camera 180 or the canister 178b of a film cartridge 182.

Each support rim 174 is part of a hub 184 or part of a flange 186, that is fixed to either the core 20 or the sheath 24 and is offset from the slot 26. Each support rim 174 is preferably an external circumference and longitudinally spaced apart from the slot 26 to protect the media strip 14 from possible misalignment against the support rim 174. It is preferred that each support rim 174 has a maximum radial dimension that is larger or smaller than a maximum radial dimension of the outer face 66 of the sheath 24. This allows interspacing with sections of the housing so as to hold the pinch spool 12 in position, while at the same time blocking media from jamming between the pinch spool 12 and the housing 178. The interspacing can also be readily configured to provide a light lock for light sensitive media.

Figure 28:
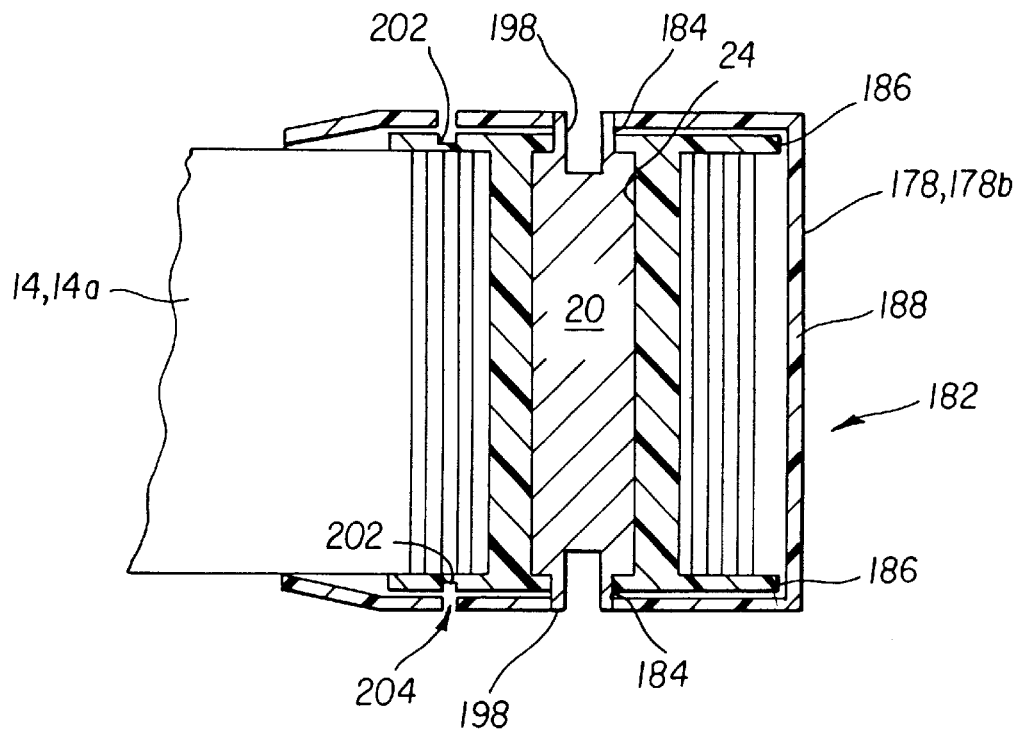
FIG. 28 is a longitudinal cross-sectional view of an embodiment of the spool-media unit that is a film cartridge. The filmstrip is shown partially withdrawn and cut-away.
Figure 29:
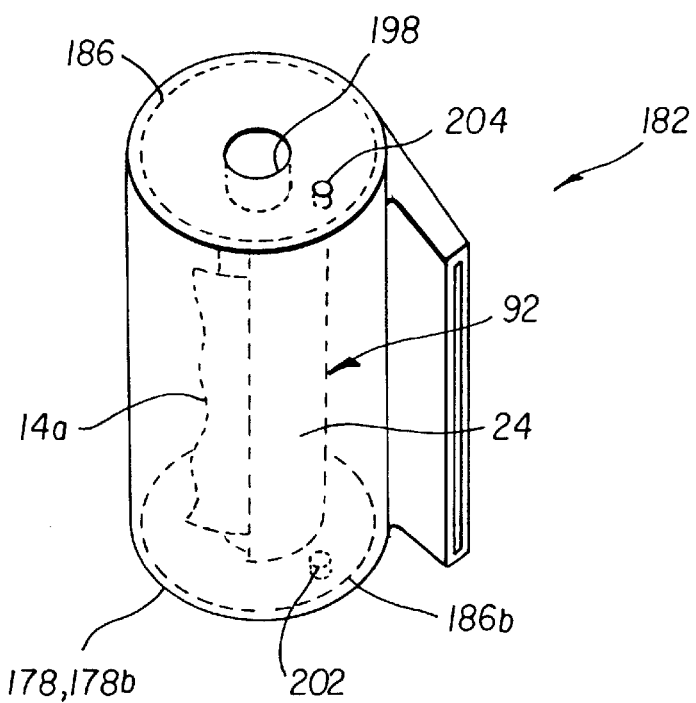
FIG. 29 is a perspective view of the film cartridge of FIG. 28. The filmstrip is not shown except near the pinch spool.

In FIGS. 24–25 and 28–29, the pinch spool 12 has primary and secondary flanges 186a,186b that are joined directly to opposite ends of the sheath 24. Each flange 186 has a circumferential support rim 174. In FIGS. 28–29, the housing is a film cartridge canister 178b and the support rims 174 of the flanges 186 bear on the sidewall 188 of the canister 178b.

Figure 26:
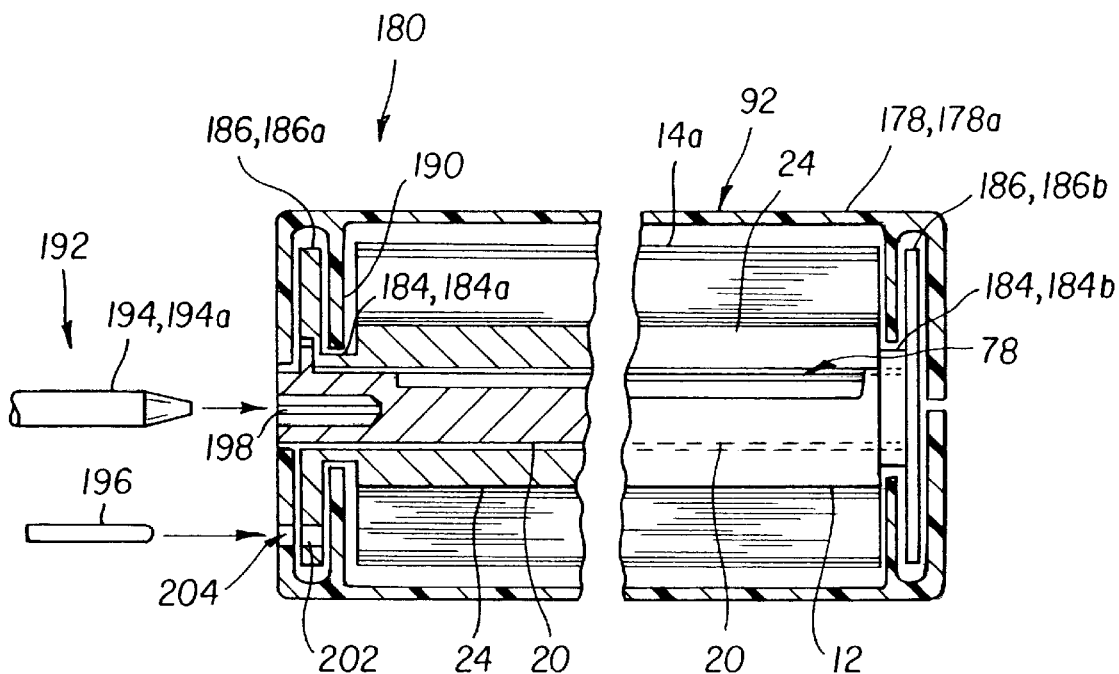
FIG. 26 is a partial cross-sectional view of an embodiment of the one-time use camera, which includes the core and sheath apparatus of FIG. 5. Also shown in partial view are the spindle and pivot tool of a spool winder.
Figure 27:
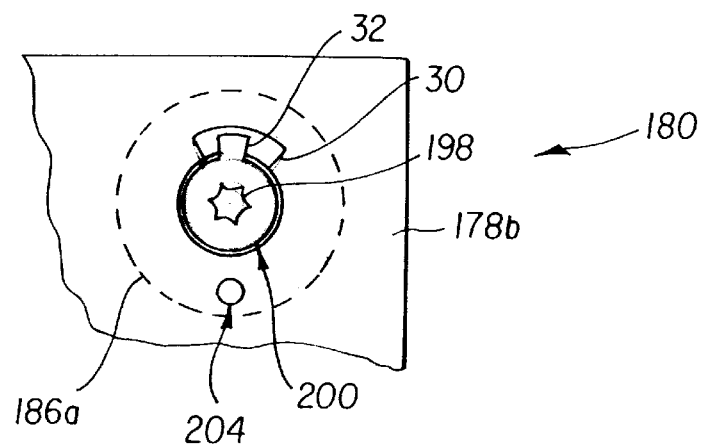
FIG. 27 is a bottom view of the camera of FIG. 18. The position of the primary flange of the pinch spool is indicated by a dashed line.

In FIGS. 26–27, the pinch spool 12 has primary and secondary hub 184a,184b that are directly connected to opposite ends of the sheath 24. Primary and secondary flanges 186a,186b are joined to respective hubs 184a,184b, in spaced relation to the sheath 24. Each hub 184 and each flange 186 has a circumferential support rim 174. The housing is a one-time use camera body 178a. The support rims 174 or the hubs 184 bear on abutments 190 of the body 178a. The support rims 174 of the flanges 186 do not contact the body 178a. By changing dimensions of the body 178a or other housing 178, support could be provided at all of the support rims 174, or by a single support rim 174 at one end, or by some combination of hub and flange support rims. The embodiment shown in FIGS. 26–27 provides good support without excessive friction and also provides a light-lock at the axial ends of the pinch spool 12.

The spool-media unit 92 is used with a spool winder 192 to wind a media strip 14 from a media supply 132, such as a large or small cartridge, or spool, or roll, onto the pinch spool 12. The spool winder 192 has a drive 100 that rotates a rotary tool 194, which rotates to wind the media strip 14, and a pivot tool 196, which provides for relative pivoting of the sheath 24 as to the core 20. The rotary tool 194 can take a variety of forms. For example, the rotary tool 194 can be a driven wheel (not shown) that frictionally engages the surface or edge of one of the flanges 186. This approach is unsuitable for embodiments of the spool-media unit 92 in which access to flanges 186 is blocked by the housing 178 prior to film winding onto the pinch spool 12. In such embodiments, it is preferred that the rotary tool 194 is a spindle 194a that is positioned concentric with the longitudinal axis 22 and that the end of the pinch spool 12 is exposed through the housing 178.

The pinch spool has a spindle seat 198. The end of the spindle 194a and the spindle seat 198 have complementary shapes that provide for a non-slip transfer of rotational force. In FIGS. 25–26, the end of the spindle 194a is shaped like a screwdriver bit and the spindle seat 198 has the shape of a corresponding socket.

The spindle seat 198 is fixed to the sheath 24 or, preferably, is fixed to the core 20. In FIGS. 15–16, the spindle seat 198 is continuous with the core 20 and the primary flange 186a. In FIGS. 17–18, the spindle seat 198 is continuous with the coupling 28 and core 20. In both cases, the spindle seat 198 surrounds a blind cavity that is light-tight relative to a media strip 14 held by the core 20 and sheath 24. The housing 178 can have an opening 200, through which the spindle seat 198 is exposed, as shown in FIG. 27. The opening 200 can be covered, when unneeded by a label (not shown) or other structure.

Referring now to FIGS. 28–29, the pinch spool 12 can have a spindle seat 198 at either end. This is useful if access is needed to both ends of the pinch spool 12. For example, such a pinch spool 12 could be useful with two different spool winders 192 having opposite directions of rotation. This can also be useful where the pinch spool 12 is part of film cartridge or other spool-media unit 92 that has a handedness. The two spindle seats 198 can have the same configuration or can differ.

The spool winder 192 provides a means for relative pivoting the core 20 and sheath 24. This can be done by holding the sheath 24 in place, while the core 20 is pivoted, or pivoting the sheath 24 while holding the core 20 in place. In either case, the sheath 24 is readily accessible and can be gripped or otherwise engaged by a wide variety of tools. In particular embodiments, the pinch spool 12 has a pivot tool seat 202 fixed to the sheath 24. The pivot tool seat 202 is spaced radially from the spindle seat 198 and longitudinally from the slot 26, and is preferably spaced radially from the support rims 174. The pivot tool seat 202 is shaped to match a particular pivot tool 196. Referring to FIGS. 15–16, the pivot tool 196 is a hollow, cylindrical tube that rotates with the spindle 194a, except during pivoting. The tube has a flattened end that engages a matching flat portion of the surface of the primary flange 186a. Referring to FIGS. 17–18, the pivot tool 196 is a small pin that extends through an opening 204 in the housing 178 and engages the matching pivot tool seat 202 in the primary flange 186a, to hold the sheath 24 in place while the core 20 is pivoted.

Figure 31:
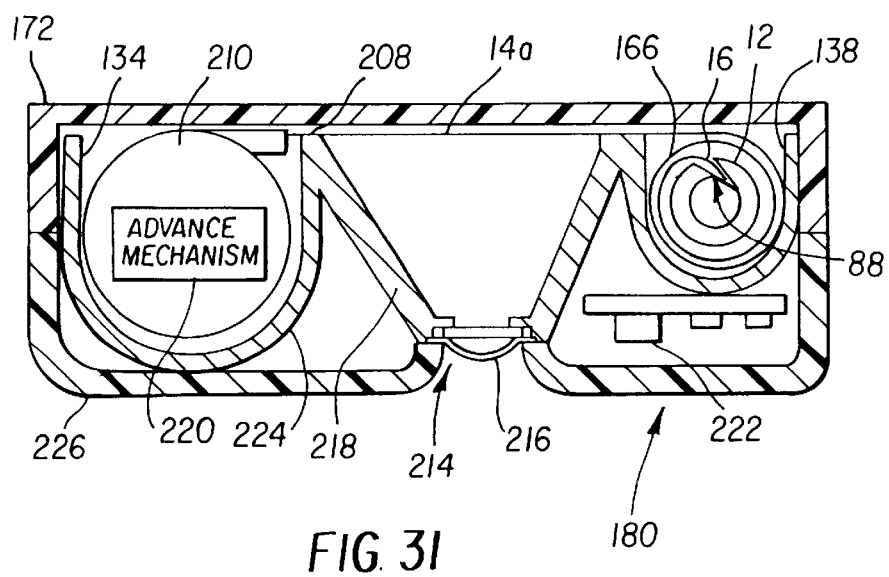
FIG. 31 is a cross-sectional view of another embodiment of the one-time use camera.
Figure 32:
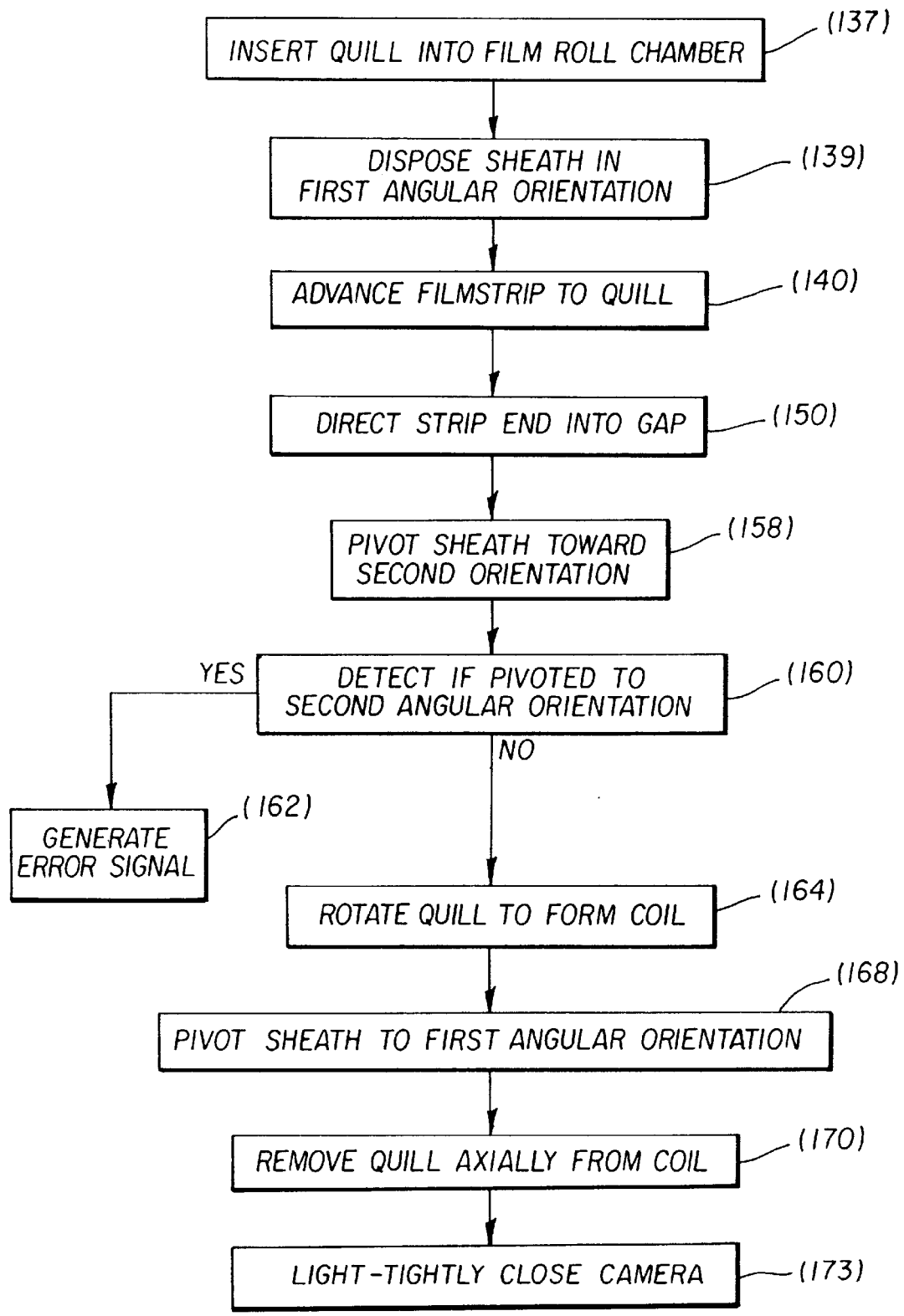
FIG. 32 is a flow-chart of the quill winding method.
Figure 33:
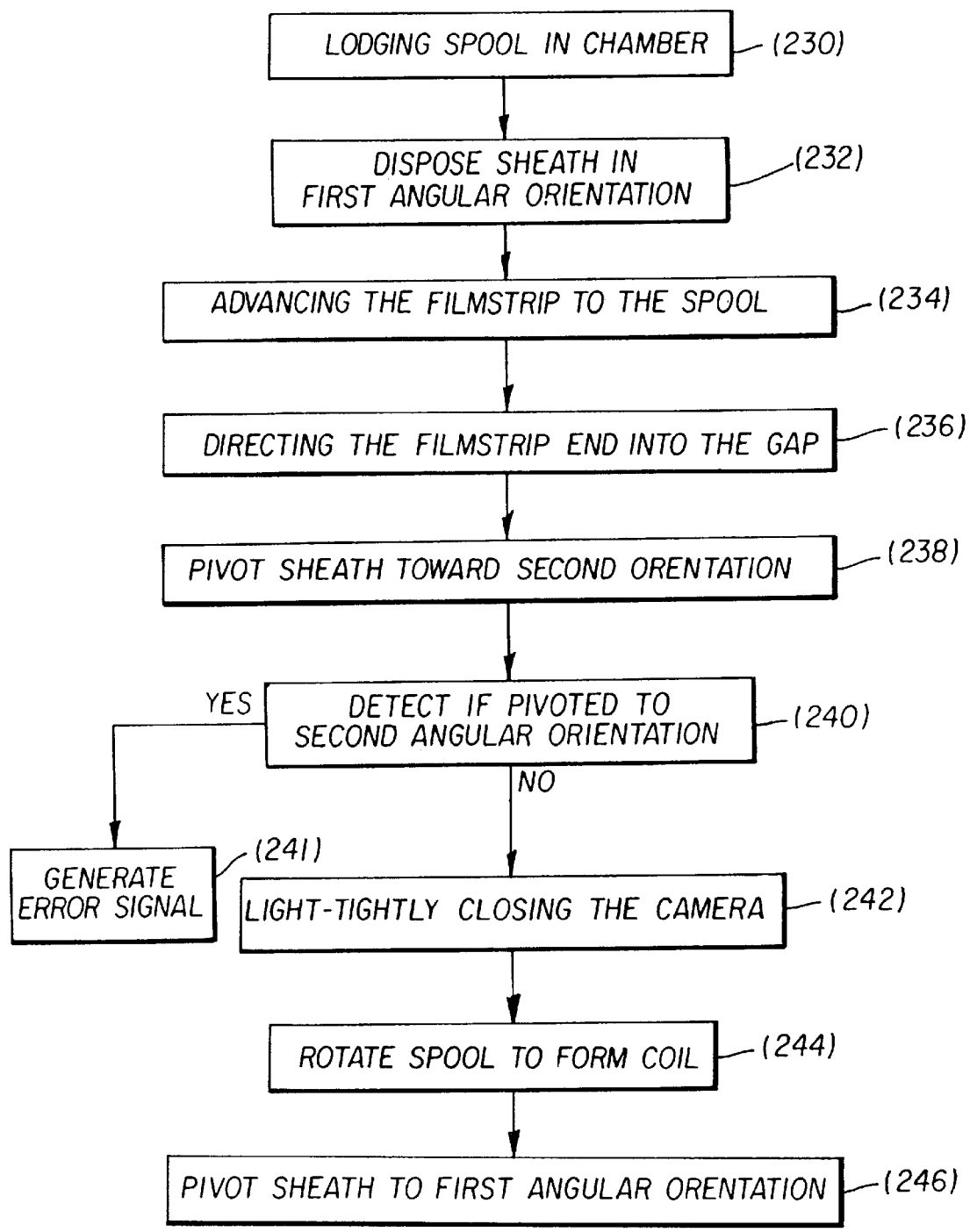
FIG. 33 is a flow-chart of the spool winding method.

Referring now to FIG. 31, a one-time use camera 180 includes the pinch spool 12 and strip 14 of film coiled about the pinch spool 12 in a film roll chamber 138. The filmstrip 14a extends from the film roll chamber 138 across an exposure frame 208 to the canister 210 of a cartridge 212 within a film cartridge chamber 134. The cartridge 212 holds the filmstrip 14a, but may or may not be a spool-media unit 92. The body 178a of the camera 180 includes an exposure system 214 that has a lens 216 and baffle 218 that direct light to the exposure frame 208, and an advance mechanism 220 (represented as a box) that moves the film from frame-to-frame for exposure. The camera 180 can include other components 222, such as a flash board, well known to those of skill in the art. The camera components are held by a frame 224 and enclosed within front and back 226,172. The end of the pinch spool 12 can be exposed through the camera body 178a in the same manner as shown in FIG. 18.

As shown in FIG. 31, in the completed camera 180, the core 20 and sheath 24 of the pinch spool 12 are in the first angular orientation and the filmstrip 14a is not gripped by the pinch spool 12. This allows a user to advance the entire filmstrip 14a out of the film roll chamber 138, during use. The film can then be removed from the camera 180 for processing, without doing anything to the pinch spool 12. FIG. 31 illustrates the filmstrip 14a as a short spiral of spaced apart turns having an end disposed within the gap 88 between the sheath 24 and core 20. This is diagrammatical. The filmstrip 14a is resilient and thus is sprung outward, within the film roll chamber 138, away from the pinch spool 12. The end of the filmstrip 14a may or may not be present in the gap 88; in either case, the end of the filmstrip 14a is freely separable from the pinch spool 12 and the film roll chamber 138. The pinch spool 12 does not rotate during camera use. The pinch spool 12 may guide the filmstrip 14a to some extent, but is otherwise non-functional during picture-taking.

In the spool winding method, a pinch spool 12 is first lodged (230) in a housing 178, such as the film roll chamber 138 of a one-time use camera 180. The spool 12 is disposed in operative relation to a media supply 132. As with the quill winding method, the nature of the media supply 132 is not critical. It is preferred that the media supply 132 is a film cartridge 212 disposed within the film cartridge chamber 134 of the one-time use camera frame assembly 136 opposite the film roll chamber 138. The camera frame assembly 136 has an open back.

Within the film roll chamber 138, the pinch quill 10 is disposed (232) in the first angular orientation. The pinch quill 10 can be in the first angular orientation when lodged in the film roll chamber 138 or can be pivoted to this orientation after placement in the film roll chamber 138. Relative pivoting of the core 20 and sheath 24 can be accomplished in any manner. In a particular embodiment shown in FIG. 30, the spindle 194a is connected to the spindle seat 198 and the pivot tool 196 is connected to the pivot tool seat 202. The pivot tool 196 holds the sheath 24 in place while the core 20 is pivoted in the anti-winding direction of rotation until the first angular orientation is achieved.

The end of the filmstrip 14 is advanced (234) out of the cartridge 212 to the spool 12 and directed (236) into the gap between the core 20 and sheath 24. This can be done by hand, but is preferably performed by automated equipment, such as a vacuum belt 142 and guide 152. FIG. 2 illustrates such equipment. (The quill, quill drive, and pivoter shown in FIG. 2 would be eliminated in this usage.)

Figure 30:
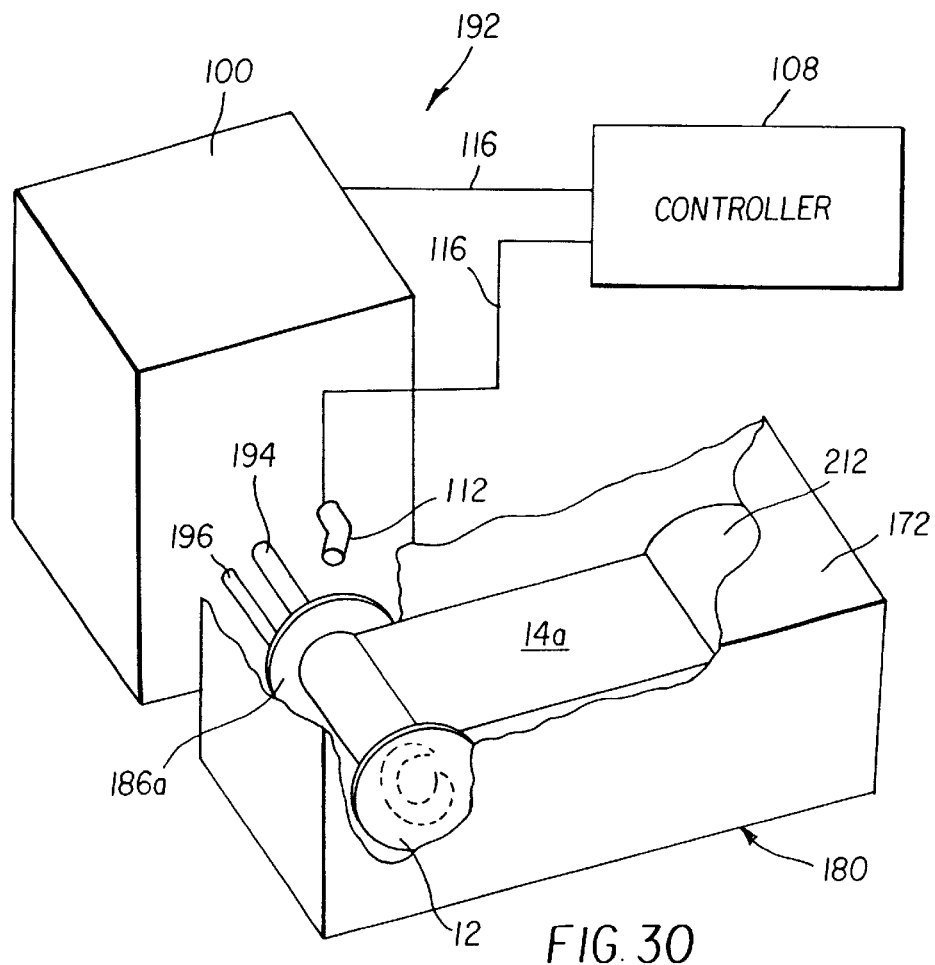
FIG. 30 is a perspective view of the one-time use camera of FIG. 26 connected to a spool winder for film winding. The camera is shown partially-cut away.

The core 20 and sheath 24 of the pivot spool 12 are next relatively pivoted (238) toward the second angular orientation until the core and sheath assume an intermediate angular orientation and the end of the filmstrip is gripped between the grip portion and chock sector. In the embodiment of FIG. 30, the pivot tool 196 holds the sheath 24 in place while the core 20 is pivoted in the winding direction of rotation until the intermediate angular orientation is achieved. As in the quill winding method, if an error has occurred and the strip 14 is not present in the gap 88, then the sheath 24 continues to rotate until the slider 32 of the coupling 28 encounters the second stop 42 and assumes the second angular orientation. This rotation can be detected (240) by the sensor 112 to generate (241) an error signal to the controller 108 which can initiate further action. The sensor 112 can operate in any of a variety of ways, such as detecting over-rotation of the core 20 or the presence of a notch or other mark 114. With a closed camera, it may be more practical to detect the position of the slider (see, for example, the positions of the slider and sensor in FIGS. 27 and 30).

The camera can be light-tightly closed (242) at this time or operations can be continued in a darkroom. The light-tightly closed camera has an exposed spindle seat 198 and pivot tool seat 202. (See, for example, FIG. 27) For example, a back 172 can be assembled with the camera frame assembly to light-tightly close the camera. The spindle and pivot tool can be withdrawn and the camera can be moved to a lighted environment in which a spindle and pivot tool can again be connected to the respective seats.

The core 20 is next rotated (244) in the winding direction of rotation. The filmstrip 14a end acting on the sheath 24 causes the sheath 24 to rotate along with the core 20. Rotation is continued until the filmstrip 14a is wound into a coil.

The core 20 and sheath 24 are next relatively pivoted (246) to the first angular orientation. In the embodiment of FIG. 30, the sheath 24 is held in place by the pivot tool 196 and the core 20 is pivoted relative to the sheath 24 in the winding direction of rotation. This alters the core 20 and sheath 24 from the intermediate angular orientation to the first angular orientation and releases the end of the filmstrip 14a from the core 20 and sheath 24. The filmstrip 14a coil clock-springs outward. The filmstrip remains coiled loosely around the spool between the flanges. The spindle 194a and pivot tool 196 are removed. The spindle seat 198 and pivot tool seat 202 can be left exposed during camera usage or can be covered by a label or the like.

The invention has been described in detail with particular reference to certain preferred embodiments thereof, but it will be understood that variations and modifications can be effected within the spirit and scope of the invention.

What is claimed is:

1. A media strip winding method comprising the steps of:
   placing an end of a strip in a gap between a core and a sheath, said gap loosely receiving said end;
   pivoting said sheath, relative to said core, in an anti-winding direction of rotation until said sheath closes against said end;

following said pivoting, rotating said sheath with said core in a winding direction of rotation opposite said anti-winding direction of rotation, until said strip forms a coil;

pivoting said sheath, relative to said core, in said winding direction of rotation until said sheath releases from said strip; and removing said core and said sheath from said coil in an axial direction.

2. The method of claim 1 further comprising prior to said placing, inserting said core and sheath into a camera film chamber.

3. The method of claim 2 further comprising, following said removing, light-tightly closing said camera.

4. The method of claim 3 wherein said pivoting steps each further comprise blowing against one of a pair of vanes joined to said sheath until said sheath rotates in the respective said direction of rotation.

5. A media strip winding method comprising the steps of:
placing an end of a strip in a gap between a core and a sheath, said gap loosely receiving said end;

pivoting said sheath, relative to said core, in an anti-winding direction of rotation until said sheath closes against said end;

following said pivoting, rotating said sheath with said core in a winding direction of rotation opposite said anti-winding direction of rotation, until said strip forms a coil;

pivoting said sheath, relative to said core, in said winding direction of rotation until said sheath releases from said strip; and removing paid core and said sheath from said coil in an axial direction;

wherein said pivoting steps each further comprise blowing against one of a pair of vanes joined to said sheath until said sheath rotates in the respective said direction of rotation.

6. The method of claim 1 further comprising closing said gap during said pivoting of said sheath in said anti-winding direction of rotation.

7. The method of claim 1 wherein said gap is between a flat face of said core and an inner wall of said sheath.

8. The method of claim 1 further comprising, prior to said placing, inserting said end of said strip through a throat of said sheath into said gap.

9. The method of claim 1 further comprising, during said rotating, gripping said end of said strip between an inner wall of said sheath and a sector of said core.

10. The method of claim 1 further comprising, during said rotating, gripping said end of said strip between a grip surface of an inner wall of said sheath and a chock sector of said core, said said inner wall having a support surface defining a cylindrical core space, said grip surface being radially spaced from said core space.

11. The method of claim 10 wherein said core has a recess sector adjoining said chock sector and said chock sector has a greater radial dimension than said recess sector.

12. The method of claim 11 wherein said recess sector has a flat face and said chock sector has an arcuate face.

13. The method of claim 1 wherein said strip is a filmstrip.

14. The method of claim 1 further comprising following said pivoting of said sheath in said winding direction of rotation, blocking further pivoting in said winding direction.

15. A media strip winding method comprising the steps of:
placing an end of a strip in a gap between a core and a sheath, said gap loosely receiving said end;

pivoting said sheath, relative to said core, in an anti-winding direction of rotation until said gap closes against said end at a pinch point between an inner wall of said sheath and a sector of said core;

following said pivoting, rotating said sheath with said core in a winding direction of rotation opposite said anti-winding direction of rotation, until said strip forms a coil;

pivoting said sheath, relative to said core, in said winding direction of rotation until said sheath releases from said strip; and removing said core and said sheath from said coil in an axial direction.

16. The method of claim 15 wherein said gap is between a flat face of said core and an inner wall of said sheath.

17. A media strip winding method comprising the steps of:
placing an end of a strip in a gap between a core and a sheath, said gap loosely receiving said end;

pivoting said sheath, relative to said core, in an anti-winding direction of rotation until paid gap closes against said end at a pinch point between an inner wall of said sheath and a sector of said core;

following said pivoting, rotating said sheath with said core in a winding direction of rotation opposite said anti-winding direction of rotation, until said strip forms a coil;

pivoting said sheath, relative to said core, in said winding direction of rotation until said sheath releases from said strip; and removing said core and said sheath from said coil in an axial direction;

wherein said pivoting steps each further comprise blowing against one of a pair of vanes joined to said sheath until said sheath rotates in the respective said direction of rotation.

18. The method of claim 17 further comprising, prior to said placing, inserting said core and sheath into a camera film chamber and, following said removing, light-tightly closing said camera.

19. The method of claim 15 further comprising, during said rotating, gripping said end of said strip between a grip surface of an inner wall of said sheath and a chock sector of said core, said said inner wall having a support surface defining a cylindrical core space, said grip surface being radially spaced from said core space, said core having a recess sector adjoining said chock sector, said chock sector having a greater radial dimension than said recess sector.

20. A media strip winding method comprising the steps of:
placing an end of a strip in a gap between a flat face of a core and an aligned grip surface of an inner wall of a sheath, said gap loosely receiving said end;

pivoting said sheath, relative to said core, in an anti-winding direction of rotation until said end is pinched between said grip surface and an arcuate chock sector of said core, said chock sector adjoining a recess sector having said flat face;

following said pivoting, rotating said sheath with said core in a winding direction of rotation opposite said anti-winding direction of rotation, until said strip forms a coil;

pivoting said sheath, relative to said core, in said winding direction of rotation until said sheath releases from said strip; and removing said core and said sheath from said coil in an axial direction.

* * * * *